United States Patent
Liu et al.

(10) Patent No.: US 12,507,143 B2
(45) Date of Patent: Dec. 23, 2025

(54) ALLOCATING CANDIDATE CELL IDENTIFIERS FOR AN INTEGRATED ACCESS AND BACKHAUL (IAB) NODE MIGRATING TO A TARGET IAB DONOR CENTRALIZED UNIT

(71) Applicant: DATANG MOBILE COMMUNICATIONS EQUIPMENT CO., LTD., Beijing (CN)

(72) Inventors: Ziqiao Liu, Beijing (CN); Li Chen, Beijing (CN); Jiancheng Sun, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 326 days.

(21) Appl. No.: 18/261,663

(22) PCT Filed: Jan. 10, 2022

(86) PCT No.: PCT/CN2022/071115
§ 371 (c)(1),
(2) Date: Jul. 14, 2023

(87) PCT Pub. No.: WO2022/152089
PCT Pub. Date: Jul. 21, 2022

(65) Prior Publication Data
US 2024/0073768 A1    Feb. 29, 2024

(30) Foreign Application Priority Data
Jan. 15, 2021    (CN) .......................... 202110054967.8

(51) Int. Cl.
*H04W 36/30*    (2009.01)
*H04W 36/00*    (2009.01)

(52) U.S. Cl.
CPC ..... *H04W 36/304* (2023.05); *H04W 36/0077* (2013.01)

(58) Field of Classification Search
CPC ............... H04W 36/08; H04W 84/047; H04W 36/0033; H04W 36/087; H04W 36/304;
(Continued)

(56) References Cited

U.S. PATENT DOCUMENTS

| | | | |
|---|---|---|---|
| 2015/0131618 A1* | 5/2015 | Chen | H04W 84/005 370/332 |
| 2021/0168667 A1* | 6/2021 | Byun | H04W 36/0011 |

(Continued)

FOREIGN PATENT DOCUMENTS

| | | |
|---|---|---|
| CN | 110662266 A | 1/2020 |
| CN | 110753314 A | 2/2020 |

(Continued)

OTHER PUBLICATIONS

CATT,"CHO and DAPS for IAB", 3GPP TSG-RAN3 Meeting #111-e, E-meeting, Jan. 25-Feb. 4, 2021, total 3 pages, R3-210101.

(Continued)

*Primary Examiner* — Allahyar Kasraian
(74) *Attorney, Agent, or Firm* — KILPATRICK TOWNSEND & STOCKTON LLP

(57) ABSTRACT

The present application relates to the field of wireless communications and provides an information transmission method and a device thereof. In the present application, a source IAB donor centralized unit (CU) of an IAB node receives first candidate cell identifiers from the IAB node or first candidate cell identifiers from a target IAB donor CU of the IAB node, the first candidate cell identifiers being allocated for the IAB node migrating to the target IAB donor CU, and the first candidate cell identifiers including candidate cell identifiers of a sub node of the JAB node and/or a (Continued)

terminal connected to the IAB node; and the source IAB donor CU sends a second candidate cell identifier to the sub node of the IAB node and/or the terminal connected to the IAB node, the second candidate cell identifier including at least one of the first candidate cell identifiers.

10 Claims, 11 Drawing Sheets

(58) Field of Classification Search
CPC ......... H04W 36/0077; H04W 36/0055; H04W 36/00
See application file for complete search history.

(56) References Cited

U.S. PATENT DOCUMENTS

| | | | |
|---|---|---|---|
| 2023/0239757 A1* | 7/2023 | Huang | H04W 36/0005 370/331 |
| 2023/0247514 A1* | 8/2023 | Li | H04W 84/047 |

FOREIGN PATENT DOCUMENTS

| | | |
|---|---|---|
| CN | 111585725 A | 8/2020 |
| CN | 112088544 A | 12/2020 |
| WO | 2020164569 A1 | 8/2020 |
| WO | 2020191768 A1 | 10/2020 |

OTHER PUBLICATIONS

Fujitsu, "CHO for UE or IAB-MT on migration", 3GPP TSG-RAN WG2 Meeting #112 electronic, Online, Nov. 2-13, 2020, total 3 pages, R2-2009007.

Huawei, "Summary of Offline Discussion on IAB inter Donor migtation_CHO and DAPS", 3GPP TSG-RAN WG3 #110-e, Online, Nov. 2-12, 2020, total 11 pages, R3-207093.

Qualcomm, "CB#11 IABInterDonorMigration", 3GPP TSG-RAN WG3#112-e, Online, Nov. 2-13, 2020, total 30 pages, R3-206854.

ZTE et al., "Discussion on inter-CU IAB migration handling", 3GPP TSG RAN WG3 Meeting #106, Reno, USA, Nov. 18-22, 2019, total 4 pages, R3-196689.

Huawei, "Inter-CU migration procedure", 3GPP TSG-RAN WG3 meeting #110-e, E-meeting, Nov. 2-12, 2020, total 5 pages, R3-206665.

* cited by examiner

ALLOCATING CANDIDATE CELL IDENTIFIERS FOR AN INTEGRATED ACCESS AND BACKHAUL (IAB) NODE MIGRATING TO A TARGET IAB DONOR CENTRALIZED UNIT

CROSS-REFERENCE TO RELATED APPLICATIONS

The present application is a National Stage of International Application No. PCT/CN2022/071115, filed on Jan. 10, 2022, which claims priority to Chinese Patent Application No. 202110054967.8, filed with the China National Intellectual Property Administration on Jan. 15, 2021 and entitled "Information Transmission Method and Device thereof", both of which is hereby incorporated by reference in their entireties.

FIELD

The present application relates to the field of wireless communication technologies, and particularly to an information transmission method and a device thereof.

BACKGROUND

The Integrated Access and Backhaul (IAB) network technology is introduced into the 5th-Generation (5G) mobile communication system, and the Access Link (AL) and Backhaul Link (BL) in the IAB network adopt a wireless transmission scheme to reduce the deployment cost and improve the deployment flexibility.

In the IAB network, an IAB donor is connected to the core network through a wired link, and an IAB node is arranged between the IAB donor node and a User Equipment (UE) (also called terminal). The access link of the IAB node provides wireless access services for the UE, and the backhaul link of the IAB node is connected to the IAB donor node to transmit the service data of the UE.

At present, when the topology of the IAB network is updated, if the IAB donor connected to the IAB node changes, the source IAB donor needs to obtain the candidate cell identifier of the IAB node under the target IAB donor to transmit to the sub node of the IAB node, but no solution has been given for this scenario.

SUMMARY

Embodiments of the present application provide an information transmission method and a device thereof, to send the candidate cell identifier of the IAB node under the target IAB donor-CU to the source IAB donor-CU of the IAB node, and the source IAB donor-CU transmits the candidate cell identifier to the sub node of the IAB node and/or the terminal connected to the IAB node.

In a first aspect, an information transmission method is provided, including: receiving, by a source IAB donor-CU of an IAB node, a first candidate cell identifier from the IAB node or a first candidate cell identifier from a target IAB donor-CU of the IAB node; where the first candidate cell identifier is allocated for the IAB node migrating to the target IAB donor-CU, and the first candidate cell identifier includes a candidate cell identifier of a sub node of the IAB node and/or a terminal connected to the IAB node; sending, by the source IAB donor-CU, a second candidate cell identifier to the sub node of the IAB node and/or the terminal connected to the IAB node, where the second candidate cell identifier includes at least one of the first candidate cell identifiers.

In one embodiment, receiving, by the source IAB donor-CU of the IAB node, the first candidate cell identifier from the IAB node, includes: receiving, by the source IAB donor, a notification message sent by the IAB node, where the notification message carries the first candidate cell identifier, and the notification message is an F1 Application Protocol (F1AP) message.

Further, the notification message further carries a mapping relationship between the first candidate cell identifier and a third cell identifier, where the third cell identifier is a cell identifier of the IAB node when the IAB node is under the source IAB donor-CU.

In one embodiment, the method further includes:
sending, by the source IAB donor-CU, a handover request message to the target IAB donor-CU;
receiving, by the source IAB donor-CU, a handover request acknowledge message sent by the target IAB donor-CU, where the handover request acknowledge message is encapsulated with a Radio Resource Control (RRC) reconfiguration message;
sending, by the source IAB donor-CU, the RRC reconfiguration message to the IAB node.

In one embodiment, receiving, by the source IAB donor-CU of the IAB node, the first candidate cell identifier from the target IAB donor-CU of the IAB node, includes:
sending, by the source IAB donor-CU, a handover request message to the target IAB donor-CU;
receiving, by the source IAB donor-CU, a handover request acknowledge message of the target IAB donor-CU, where the handover request acknowledge message carries an RRC reconfiguration message and the first candidate cell identifier;
sending, by the source IAB donor-CU, the RRC reconfiguration message to the IAB node.

Further, after the source IAB donor-CU receives the handover request acknowledge message of the target IAB donor-CU, the method further includes: determining, by the source IAB donor-CU, a mapping relationship between a third cell identifier of the IAB node and the first candidate cell identifier, where the third cell identifier is a cell identifier of the IAB node when the IAB node is under the source IAB donor-CU;
sending, by the source IAB donor-CU, the second candidate cell identifier to the sub node of the IAB node and/or the terminal connected to the IAB node, includes:
sending, by the source IAB donor-CU, at least one of the first candidate cell identifiers to the sub node of the IAB node and/or the terminal connected to the IAB node according to the mapping relationship.

In one embodiment, when the first candidate cell identifier is from the IAB node, the first candidate cell identifier is obtained by the IAB node from the target IAB donor-CU; or, when the first candidate cell identifier is from the IAB node, the first candidate cell identifier is obtained by the IAB node from an OAM network element.

Further, the first candidate cell identifier is obtained according to an F1 setup response message from the target IAB donor-CU when the IAB node establishes an F1 connection with the target IAB donor-CU, and the F1 setup response message carries the first candidate cell identifier allocated by the target IAB donor-CU to the IAB node.

In one embodiment, when the first candidate cell identifier is from the target IAB donor-CU, the first candidate cell identifier is allocated by the target IAB donor-CU to the IAB node according to an F1 setup request message from the IAB node; or, when the first candidate cell identifier is from the target IAB donor-CU, the first candidate cell identifier is obtained by the target IAB donor-CU from an OAM network element.

In one embodiment, the method further includes: receiving, by the source IAB donor-CU, a mapping relationship between the first candidate cell identifier and a third cell identifier from the IAB node, where the third cell identifier is a cell identifier of the IAB node when the IAB node is under the source IAB donor-CU; or determining, by the source IAB donor-CU, the mapping relationship; sending, by the source IAB donor-CU, the second candidate cell identifier to the sub node of the IAB node and/or the terminal connected to the IAB node, includes: sending, by the source IAB donor-CU, at least one of the first candidate cell identifiers to the sub node of the IAB node and/or the terminal connected to the IAB node according to the mapping relationship.

In one embodiment, sending, by the source IAB donor-CU, the second candidate cell identifier to the sub node of the IAB node and/or the terminal connected to the IAB node, includes: sending, by the source IAB donor-CU, an RRC reconfiguration message to the sub node and/or the terminal connected to the IAB node, where the RRC reconfiguration message carries the second candidate cell identifier.

In one embodiment, the method further includes: sending, by the source IAB donor-CU, handover-related configuration information to the sub node and/or the terminal connected to the IAB node.

In a second aspect, an information transmission method is provided, including:
  obtaining, by a target IAB donor-CU of an IAB node, a first candidate cell identifier; where the first candidate cell identifier is allocated for the IAB node migrating to the target IAB donor-CU, and the first candidate cell identifier includes a candidate cell identifier of a sub node of the IAB node and/or a terminal connected to the IAB node;
  sending, by the target IAB donor-CU, the first candidate cell identifier to a source IAB donor-CU of the IAB node.

In one embodiment, obtaining, by the target IAB donor-CU of the IAB node, the first candidate cell identifier, includes:
  receiving, by the target IAB donor-CU, an F1 setup request message from the IAB node;
  allocating, by the target IAB donor-CU, the first candidate cell identifier to the IAB node according to the F1 setup request message, and sending an F1 setup response message to the IAB node, where the F1 setup response message carries the first candidate cell identifier.

In one embodiment, obtaining, by the target IAB donor-CU of the IAB node, the first candidate cell identifier, includes: obtaining, by the target IAB donor-CU, the first candidate cell identifier from an Operations Administration and Maintenance (OAM) network element.

In one embodiment, sending, by the target IAB donor-CU, the first candidate cell identifier to the source IAB donor-CU of the IAB node, includes:
  receiving, by the target IAB donor-CU, a handover request message from the source IAB donor-CU;
  sending, by the target IAB donor-CU, a handover request acknowledge message to the source IAB donor-CU, where the handover request acknowledge message carries the first candidate cell identifier.

In a third aspect, an information transmission method is provided, including:
  obtaining, by an IAB node, a first candidate cell identifier; where the first candidate cell identifier is allocated for the IAB node migrating to a target IAB donor-CU, and the first candidate cell identifier includes a candidate cell identifier of a sub node of the IAB node and/or a terminal connected to the IAB node;
  sending, by the IAB node, the first candidate cell identifier to a source IAB donor-CU of the IAB node.

In one embodiment, obtaining, by the IAB node, the first candidate cell identifier, includes:
  sending, by the IAB node, an F1 setup request message to the target IAB donor-CU of the IAB node;
  receiving, by the IAB node, an F1 setup response message sent by the target IAB donor-CU, where the F1 setup response message carries the first candidate cell identifier allocated by the target IAB donor-CU to the IAB node.

In one embodiment, obtaining, by the IAB node, the first candidate cell identifier, includes: obtaining, by the IAB node, the first candidate cell identifier from an OAM network element.

In one embodiment, sending, by the IAB node, the first candidate cell identifier to the source IAB donor-CU of the IAB node, includes: sending, by the IAB node, a notification message to the source IAB donor, where the notification message carries the first candidate cell identifier, and the notification message is an F1AP message.

In one embodiment, the notification message further carries a mapping relationship between the first candidate cell identifier and a third cell identifier, where the third cell identifier is a cell identifier of the IAB node when the IAB node is under the source IAB donor-CU.

In a fourth aspect, an IAB donor-CU device is provided, including:
  a receiving device configured to receive a first candidate cell identifier from an IAB node or a first candidate cell identifier from a target IAB donor-CU of the IAB node; where the first candidate cell identifier is allocated for the IAB node migrating to the target IAB donor-CU, and the first candidate cell identifier includes a candidate cell identifier of a sub node of the IAB node and/or a terminal connected to the IAB node;
  a sending device configured to send a second candidate cell identifier to the sub node of the IAB node and/or the terminal connected to the IAB node, where the second candidate cell identifier includes at least one of the first candidate cell identifiers.

In a fifth aspect, an IAB donor-CU device is provided, including:
  a processing device configured to obtain a first candidate cell identifier; where the first candidate cell identifier is allocated for an IAB node migrating to a target IAB donor-CU, and the first candidate cell identifier includes a candidate cell identifier of a sub node of the IAB node and/or a terminal connected to the IAB node;
  a sending device configured to send the first candidate cell identifier to a source IAB donor-CU of the IAB node.

In a sixth aspect, an IAB node device is provided, including:
  a receiving device configured to obtain a first candidate cell identifier; where the first candidate cell identifier is allocated for an IAB node migrating to a target IAB donor-CU, and the first candidate cell identifier includes a candidate cell identifier of a sub node of the IAB node and/or a terminal connected to the IAB node;

a sending device configured to send the first candidate cell identifier to a source IAB donor-CU of the IAB node.

In a seventh aspect, a communication device is provided, including: a processor and a memory; where the memory stores computer instructions; and the processor is configured to read the computer instructions and perform the information transmission method as described in the above first aspect.

In an eighth aspect, a communication device is provided, including: a processor and a memory; where the memory stores computer instructions; and the processor is configured to read the computer instructions and perform the information transmission method as described in the above second aspect.

In a ninth aspect, a communication device is provided, including: a processor and a memory; where the memory stores computer instructions; and the processor is configured to read the computer instructions and perform the information transmission method as described in the above third aspect.

In a tenth aspect, a computer readable storage medium is provided, where the computer readable storage medium stores computer executable instructions, which are configured to cause a computer to perform the information transmission method as described in the above first aspect, or the information transmission method as described in the above second aspect, or the information transmission method as described in the above third aspect.

In the above embodiments of the present application, the source IAB donor-CU of the IAB node receives the candidate cell identifier (which is allocated for the IAB node migrating to the target IAB donor-CU, and includes a candidate cell identifier of the sub node of the IAB node and/or the terminal connected to the IAB node) from the IAB node or the target IAB donor-CU of the IAB node, and then sends the candidate cell identifier to the sub node of the IAB node and/or the terminal connected to the IAB node, and the sub node of the IAB node and/or the terminal connected to the IAB node can perform cell measurement and cell handover according to the candidate cell identifier after the IAB node migrates to the target IAB donor-CU.

BRIEF DESCRIPTION OF FIGURES

In order to illustrate the embodiments of the present application more clearly, the accompanying drawings which need to be used in the embodiments of the present application will be introduced below briefly. The accompanying drawings introduced below are only some embodiments of the present application.

DETAILED DESCRIPTION

Embodiments of the present application will be further illustrated below in details with reference to the accompanying figures. The described embodiments are merely a part of the embodiments of the present application but not all the embodiments.

(1) In the embodiments of the present application, the nouns "network" and "system" are often used alternately.

(2) The term "a plurality of" in the embodiments of the present application refers to two or more, and other quantifiers are similar thereto.

(3) "and/or" describes the association relationship of the associated objects, and indicates that there may be three relationships, for example, A and/or B may represent: only A, both A and B, and only B. The character "/" generally indicates that the associated objects have a kind of "or" relationship.

Figure 1:
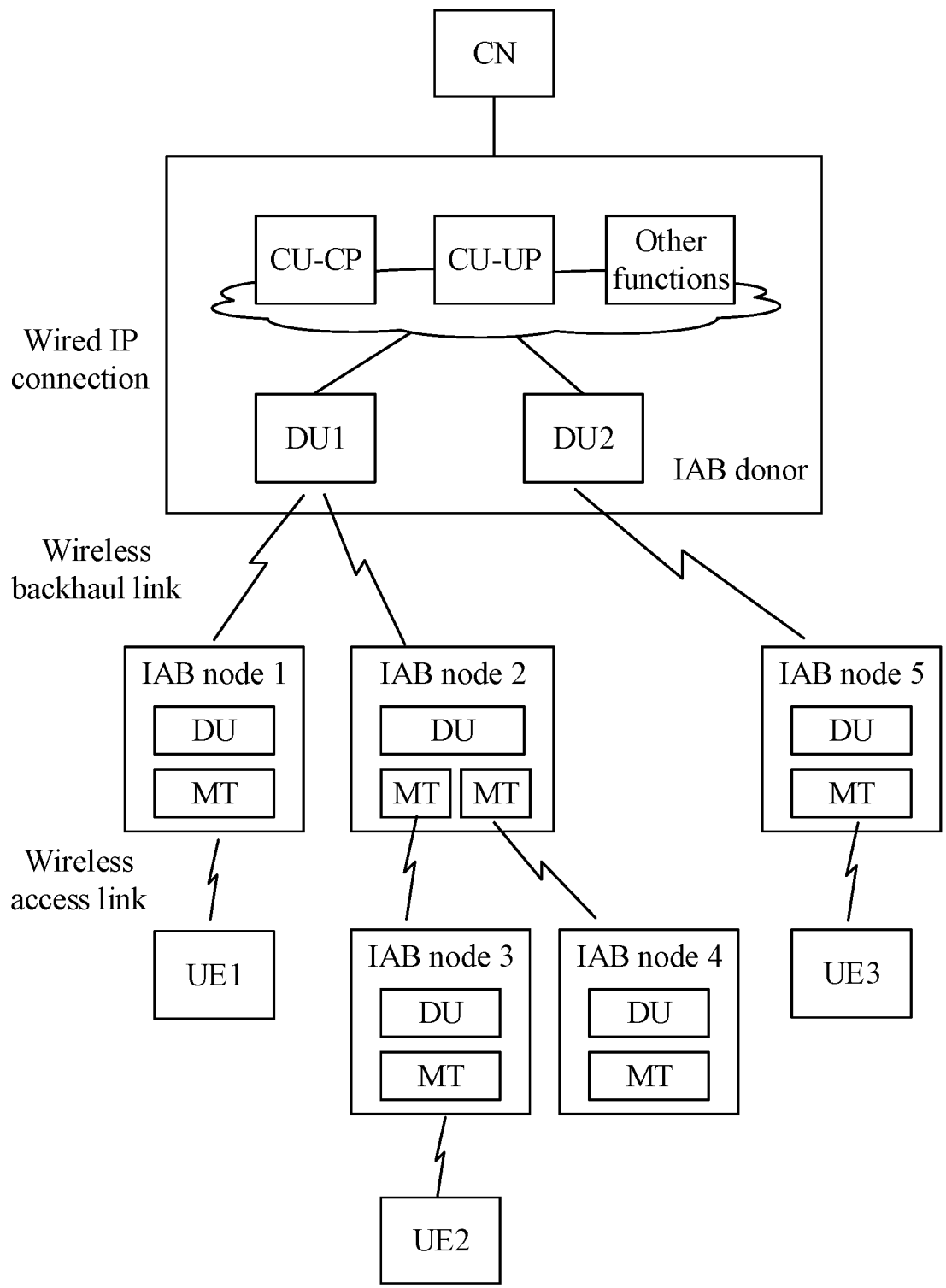
FIG. 1 is a topology diagram of an IAB network according to an embodiment of the present application.

Referring to FIG. 1, it is a topology diagram of an IAB network applicable to the embodiments of the present application.

As shown in FIG. 1, the IAB network includes an IAB donor (also called IAB donor node), IAB nodes and UEs.

The IAB donor includes two parts: IAB donor Centralized Unit (IAB donor-CU for short) and IAB donor Distributed Unit (IAB donor-DU for short), where there may be IAB donor-DUs under one IAB donor-CU.

Here, the IAB donor-CU may also be in the form of the Control Plane (CP) separated from the User Plane (UP). For example, one IAB donor-CU consists of one CU-CP (also called IAB-donor-CU-CP) and CU-UPs (also called IAB-donor-CU-UPs), which is not limited in the embodiment of the present application.

The IAB node includes an IAB node Distributed Unit (IAB node-DU for short) and an IAB node Mobile Termination (IAB node-MT for short). The IAB node-DU is connected to the IAB donor-CU through the F1 interface, and the IAB node-MT is partially connected to the IAB node-DU of the next layer through the Uu interface. The DU of the IAB node may also be connected to a UE.

For example, as shown in FIG. 1, the DU of the IAB node 1 is connected to the IAB donor-CU through the F1 interface, and the MT of the IAB node 1 is connected to the UE1 through the Uu interface.

The DU of the IAB node 2 is connected to the IAB donor-CU through the F1 interface, the MT of the IAB node 2 is connected to the DU of the IAB node 3 through the Uu interface and connected to the DU of the IAB node 4 through the Uu interface, and the MT of the IAB node 3 is connected to the UE2 through the Uu interface, where the IAB node 3 and IAB node 4 are sub nodes of the IAB node 2.

The UE in the IAB network, also referred to as terminal, is a device that can provide users with voice and/or data connectivity. For example, the terminal device includes a handheld device with wireless connection function, a vehicle-mounted device, etc. At present, the terminal device may be: mobile phone, tablet, laptop, palmtop computer, Mobile Internet Device (MID), wearable device, Virtual Reality (VR) device, Augmented Reality (AR) device, wireless terminal in the industrial control, wireless terminal in the self driving, wireless terminal in the smart grid, wireless terminal in the transportation safety, wireless terminal in the smart city, or wireless terminal in the smart home, etc.

Based on the above JAB network, the JAB node needs to be able to switch from one IAB donor-CU to another IAB donor-CU, and this switch is also called inter-CU migration. The inter-CU migration means that a migration node (which is an JAB node) and its sub nodes and UEs migrate from the source IAB donor-CU to the target IAB donor-CU, that is, the IAB donor-CU connected to the migration node changes.

Figure 2:
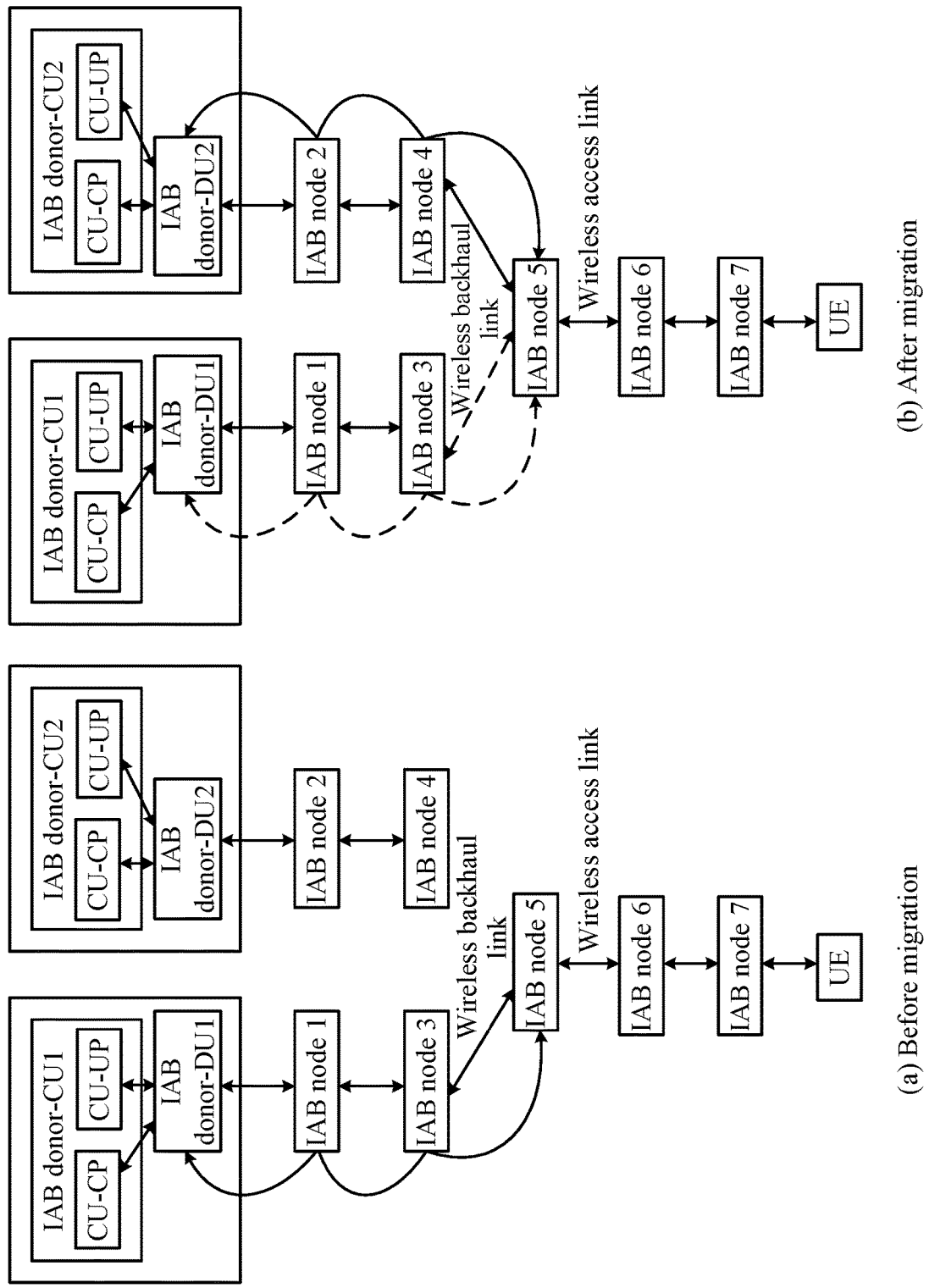
FIG. 2 is a schematic diagram of an inter-CU handover scenario according to an embodiment of the present application.

FIG. 2 exemplarily shows a schematic diagram of a scenario of the inter-CU migration.

As shown in FIG. 2, the JAB node 5 is the migration node, the IAB donor-CU1 is the source IAB donor-CU of the migration node (i.e., IAB node 5), and the IAB donor-CU2 is the target IAB donor-CU of the migration node (i.e., IAB node 5). After the migration node (i.e., IAB node 5) migrates from the IAB donor-CU1 to the IAB donor-CU2, the IAB node 6, the IAB node 7 and the UE under the JAB node 5 are all migrated to the IAB donor-CU2.

After the migration node migrates to the target IAB donor-CU, the sub nodes and UEs of the migration node need to perform cell measurement on the corresponding candidate cell according to the candidate cell identifier of the migration node under the target IAB donor-CU, and perform cell handover based on the measurement result. However, there is currently no method for notifying the sub node and terminal of the migration node of the candidate cell identifier of the migration node under the target IAB donor-CU.

To this end, some embodiments of the present application provide an information transmission method and a device thereof, to send the candidate cell identifier of the IAB node under the target IAB donor-CU to the source IAB donor-CU of the IAB node, and the source IAB donor-CU transmits the candidate cell identifier to the sub node of the IAB node and/or the terminal connected to the sub node of the IAB node, to enable the sub node and/or the terminal connected to the sub node of the IAB node to measure the corresponding candidate cell and perform cell handover.

Some embodiments of the present application can be applied to various mobile communication systems, for example, New Radio (NR) system, Long Term Evolution (LTE) system, Advanced Long Term Evolution (LTE-A) system, evolved Long Term Evolution (eLTE) system, future communication systems and other communication systems, which are not limited in the embodiments of the present application.

Some embodiments of the present application will be described below in detail with reference to the drawings.

Figure 3:
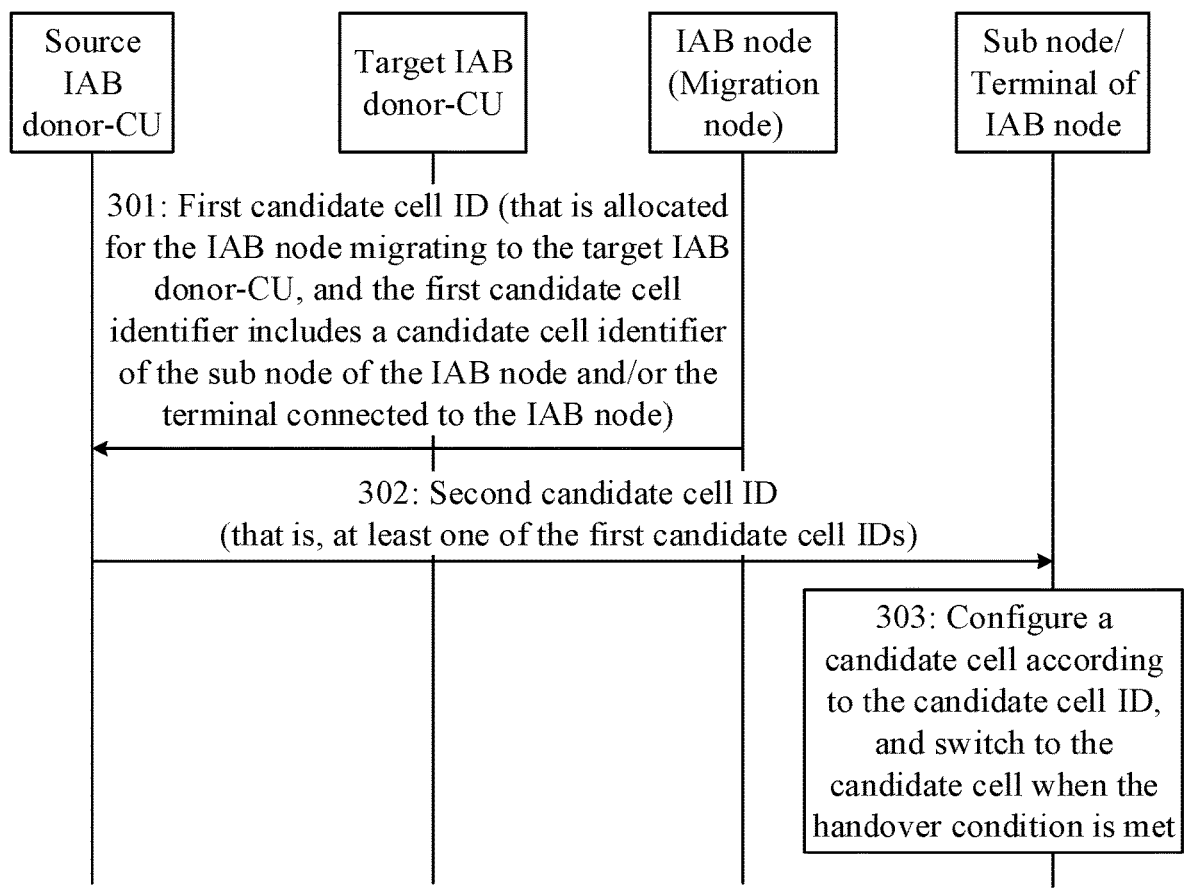
FIG. 3 and FIG. 4 are schematic diagrams of the information transmission process according to the embodiments of the present application, respectively.

Referring to FIG. 3, it is a schematic flowchart of an information transmission method according to an embodiment of the present application. As shown, the process may include: Step 301: An IAB node sends a first candidate cell identifier to a source IAB donor-CU of the IAB node.

Here, the first candidate cell identifier is allocated for an IAB node migrating to a target IAB donor-CU, and the first candidate cell identifier includes a candidate cell identifier of a sub node of the IAB node and/or a terminal connected to the IAB node. In one embodiment, there may be one or more candidate cell identifiers.

In one embodiment, in some embodiments, the IAB node may send the first candidate cell identifier to the source IAB donor-CU through the F1 interface between the IAB node and the source IAB donor-CU. In one embodiment, the IAB node may send a notification message to the source IAB donor-CU, where the notification message carries the first candidate cell identifier, and the notification message is an F1 Application Protocol (F1AP) message.

Further, before sending the first candidate cell identifier to the source IAB donor-CU, the IAB node may establish an F1 connection with the target IAB donor-CU, and obtain the first candidate cell identifier from the target IAB donor-CU through the F1 connection establishment process with the target IAB donor-CU, to send the first candidate cell identifier to the source IAB donor-CU through the F1 interface. In one embodiment, the F1 connection establishment process may include: the DU of the IAB node sends an F1 setup request message to the target IAB donor-CU to request to establish an F1 connection with the target IAB donor-CU; and the target IAB donor-CU allocates the first candidate cell identifier for the IAB node after receiving the F1 setup request message, and sends an F1 setup response message carrying the first candidate cell identifier to the IAB node.

Further, after the IAB node sends the first candidate cell identifier to the source IAB donor-CU through the F1 interface, the MT reconfiguration process may also be performed. In one embodiment, the MT reconfiguration process may include: the source IAB donor-CU sends a handover request message to the target IAB donor-CU; the target IAB donor-CU sends a handover request acknowledge message to the source IAB donor-CU after receiving the handover request message, where the handover request acknowledge message is encapsulated with a Radio Resource Control (RRC) reconfiguration message; and the source IAB donor-CU sends the RRC reconfiguration message to the IAB node.

In one embodiment, in some other embodiments, the IAB node may obtain the first candidate cell identifier from an Operations Administration and Maintenance (OAM) network element before sending the first candidate cell identifier to the source IAB donor-CU. In one embodiment, the IAB node sends an obtaining request to the OAM network element, for requesting to obtain the candidate cell identifier of the sub node of the IAB node when the IAB node is under the target IAB donor-CU of the IAB node; and the OAM network element returns a response message to the IAB node after receiving the request message, where the response message carries the first candidate cell identifier.

Further, after the IAB node obtains the first candidate cell identifier from the OAM and sends the first candidate cell identifier to the source IAB donor-CU, a process of establishing an F1 connection between the IAB node and the target IAB donor-CU is also included. In one embodiment, the process of establishing the F1 connection may include: the DU of the IAB node sends an F1 setup request message to the target IAB donor-CU to request to establish an F1 connection with the target IAB donor-CU; and the target IAB donor-CU sends an F1 setup response message to the IAB node.

Further, after the IAB node obtains the first candidate cell identifier from the OAM and sends the first candidate cell identifier to the source IAB donor-CU, the MT reconfiguration process may also be performed. Here, the MT reconfiguration process is the same as the above-mentioned MT reconfiguration process.

Step 302: The source IAB donor-CU sends a second candidate cell identifier to the sub node of the IAB node and/or the terminal connected to the IAB node.

In one embodiment, the source IAB donor-CU may decide to configure one or more of the first candidate cell identifiers for the sub node of the IAB node and/or the terminal connected to the IAB node, where the second candidate cell identifier includes at least one of the first candidate cell identifiers. For example, the first candidate cell identifiers include a cell identifier 1, a cell identifier 2 and a cell identifier 3; and the second candidate cell identifiers may include the cell identifier 1, cell identifier 2 and cell identifier 3, or may include only a part of the three cell identifiers, for example, include the cell identifier 1 and cell identifier 2, or include only the cell identifier 1.

In one embodiment, the source IAB donor-CU may send an RRC reconfiguration message to the of the IAB node and/or the terminal connected to the sub node of the IAB, where the RRC reconfiguration message carries the second candidate cell identifier, to send the second candidate cell identifier to the sub node of the IAB node and/or the terminal connected to the sub node of the IAB node.

In one embodiment, the source IAB donor-CU may also send the handover configuration information corresponding to the second candidate cell identifier to the sub node of the IAB node and/or the terminal connected to the sub node of the IAB node. In one embodiment, the source IAB donor-CU may send the handover-related configuration information to the sub node of the IAB node and/or the terminal connected to the sub node of the IAB node through the RRC reconfiguration message. In one embodiment, the handover-related configuration information may include: access configuration information required for handover, optional radio resource configuration information, and the like.

Further, the above process may further include the following step.

Step 303: the sub node of the IAB node and/or the terminal connected to the sub node of the IAB node measures a corresponding candidate cell according to the second candidate cell identifier after receiving the second candidate cell identifier, and switches to the candidate cell when determining that the handover condition is met according to the measurement result of the candidate cell.

Further, the IAB node may also send a mapping relationship between the cell identifier before the migration of the IAB node (that is, the third cell identifier, i.e., the cell identifier of the IAB node when the IAB node is under the source IAB donor-CU) and the first candidate cell identifier to the source IAB donor-CU, and the original IAB donor-CU performs handover preparation and handover configuration according to the mapping relationship. In one embodiment, the IAB node may carry the mapping relationship in the notification message and send it to the source IAB donor-CU.

Here, one or more first candidate cells may be configured for each third cell in the above mapping relationship. For example, before the migration of the IAB node, there are three cells, which are cell 1, cell 2 and cell 3 respectively; after the migration of the IAB node, the candidate cells include cell 4, cell 5 and cell 6. The IAB node can determine the following mapping relationship: cell 1 corresponds to cell 4, cell 2 corresponds to cell 4 and cell 5, and cell 3 corresponds to cell 6.

It should be noted that the rule or policy that the above mapping relationship relies on may be configured according to actual needs, and is not limited in the embodiments of the present application.

In one embodiment, the source IAB donor-CU may send at least one of the first candidate cell identifiers to the sub node of the IAB node and/or the terminal connected to the sub node of the IAB node according to the mapping relationship.

Still taking the above mapping relationship as an example, if the sub node 1 of the IAB node has two cells (namely cell 1 and cell 2) before migration, the RRC reconfiguration message sent by the source IAB donor-CU to the sub node 1 carries the following mapping relationship of cell identifiers: the candidate cell corresponding to cell 1 is cell 4, and the candidate cells corresponding to cell 2 are cell 4 and cell 5; if the UE of the IAB node is located in cell 3 before migration, the RRC reconfiguration message sent by the source IAB donor-CU to the UE includes the following mapping relationship of cell identifiers: the candidate cell corresponding to cell 3 is cell 6.

In the above embodiment of the present application, the source IAB donor sends the first candidate cell identifier to the sub node of the IAB node and/or the terminal connected to the sub node of the IAB node after receiving the first candidate cell identifier from the IAB node, and the sub node of the IAB node and/or the terminal connected to the sub node of the IAB node can perform cell measurement and cell handover according to the candidate cell identifier after the IAB node migrates to the target IAB donor-CU.

Figure 4:
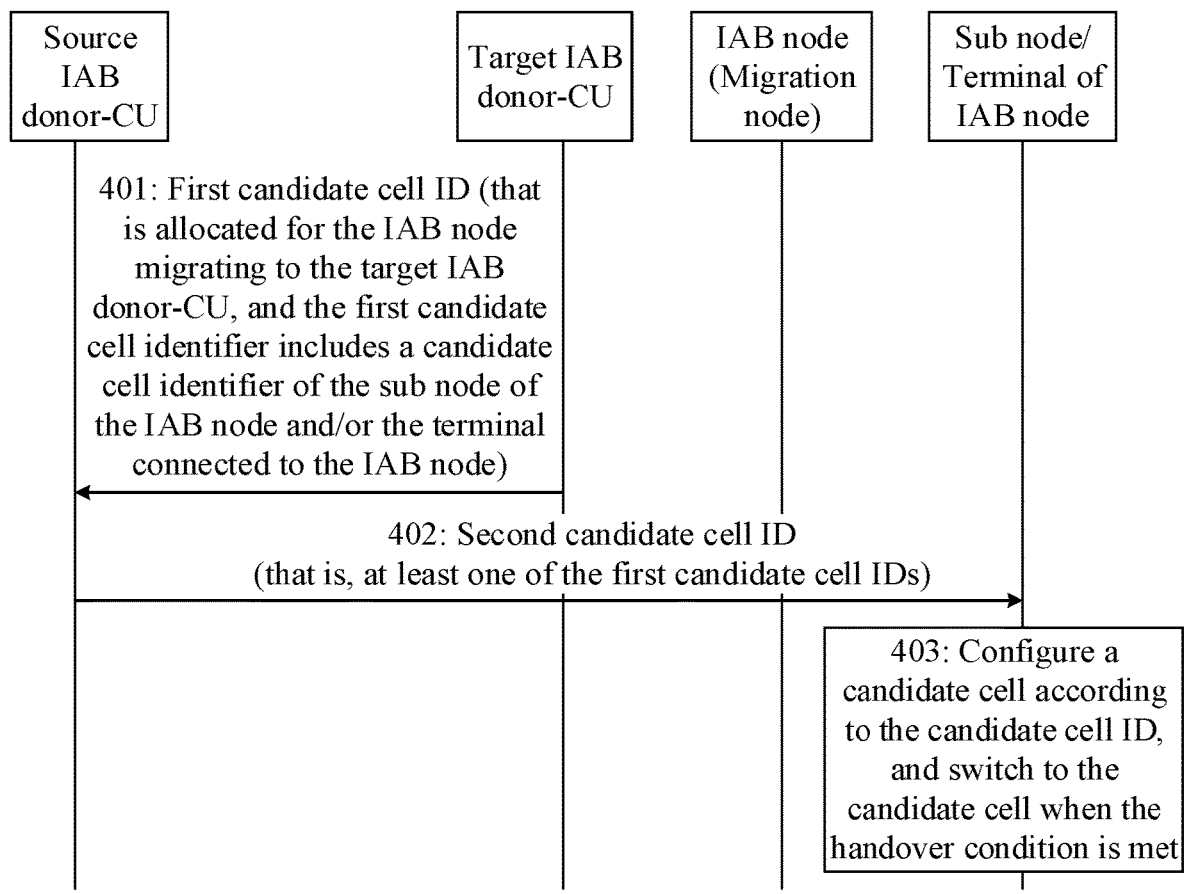

Referring to FIG. 4, it is a schematic flowchart of an information transmission method according to an embodiment of the present application. As shown, the process may include: Step 401: A target IAB donor-CU of an IAB node sends a first candidate cell identifier to a source IAB donor-CU of the IAB node.

Here, the first candidate cell identifier has the same meaning as that in the foregoing embodiments.

In one embodiment, the target IAB donor-CU may send the first candidate cell identifier to the source IAB donor-CU through an Xn interface message, such as an XnAP message, between the target IAB donor-CU and the source IAB donor-CU.

In one embodiment, the target IAB donor-CU may send the first candidate cell identifier to the source IAB donor-CU through the MT reconfiguration process for the IAB node.

In some embodiments, the MT reconfiguration process for the IAB node may include: the source IAB donor-CU sends a handover request message to the target IAB donor to request reconfiguration of the MT of the IAB node; the target IAB donor-CU sends a handover request acknowledge message to the source IAB donor-CU after receiving the handover request message, where the handover request acknowledge message is encapsulated with an RRC reconfiguration message and the first candidate cell identifier; and the source IAB donor-CU sends the RRC reconfiguration message to the IAB node.

In one embodiment, in some embodiments, before the target IAB donor-CU sends the first candidate cell identifier to the source IAB donor-CU, the IAB node establishes an F1 connection with the target IAB donor-CU, and the target IAB donor-CU allocates the first candidate cell identifier for the IAB node through the F1 connection establishment process, and the target IAB donor-CU sends the first candidate cell identifier to the source IAB donor-CU in step 401. In one embodiment, the F1 connection establishment process may include: the DU of the IAB node sends an F1 setup request message to the target IAB donor-CU to request to establish an F1 connection with the target IAB donor-CU; and the target IAB donor-CU allocates the first candidate cell identifier for the IAB node after receiving the F1 setup request message, and sends an F1 setup response message carrying the first candidate cell identifier to the IAB node.

In one embodiment, in other embodiments, the target IAB donor-CU obtains the first candidate cell identifier from the OAM network element before sending the first candidate cell identifier to the source IAB donor-CU, and the target IAB donor-CU sends the first candidate cell identifier to the source IAB donor-CU in step 401.

In one embodiment, the process in which the target IAB donor-CU obtains the first candidate cell identifier from the OAM may include: the target IAB donor-CU sends an obtaining request to the OAM network element, for requesting to obtain the candidate cell identifier of the sub node of the IAB node when the IAB node is under the target IAB donor-CU of the IAB node; and the OAM network element returns a response message to the target IAB donor-CU after receiving the request message, where the response message carries the first candidate cell identifier.

In one embodiment, the IAB node also establishes an F1 connection with the target IAB donor-CU. In one embodiment, the F1 connection establishment process may include: the DU of the IAB node sends an F1 setup request message to the target IAB donor-CU; and the target IAB donor-CU sends an F1 setup response message to the IAB node after receiving the F1 setup request message.

In one embodiment, after obtaining the first candidate cell identifier, the source IAB donor-CU may determine a mapping relationship between the cell identifier before migration (that is, the third cell identifier, i.e., the cell identifier of the IAB node when the IAB node is under the source IAB donor-CU) and the first candidate cell identifier.

Step 402: The source IAB donor-CU sends a second candidate cell identifier to the sub node of the IAB node and/or the terminal connected to the sub node of the IAB node.

In one embodiment, the source IAB donor-CU may decide to configure one or more of the first candidate cell identifiers for the sub node of the IAB node and/or the terminal connected to the sub node of the IAB node, where the second candidate cell identifier includes at least one of the first candidate cell identifiers.

In one embodiment, the source IAB donor-CU may send at least one of the first candidate cell identifiers to the sub node of the IAB node and/or the terminal connected to the sub node of the IAB node according to the above mapping relationship.

The specific implementation of this step is the same as the relevant content in the process shown in FIG. 3, and will not be repeated here.

In one embodiment, the source IAB donor-CU may also send the handover configuration information corresponding to the second candidate cell identifier to the sub node of the IAB node and/or the terminal connected to the sub node of the IAB node. In one embodiment, the source IAB donor-CU may send the handover-related configuration information to the sub node of the IAB node and/or the terminal connected to the sub node of the IAB node through the RRC reconfiguration message.

Further, the above process may further include the following step.

Step 403: the sub node of the IAB node and/or the terminal connected to the sub node of the IAB node measures a corresponding candidate cell according to the second candidate cell identifier after receiving the second candidate cell identifier, and switches to the candidate cell when determining that the handover condition is met according to the measurement result of the candidate cell.

In the above embodiment of the present application, the source IAB donor-CU of the IAB node sends the candidate cell identifier to the sub node of the IAB node and/or the terminal connected to the sub node of the IAB node after receiving the candidate cell identifier (which is the candidate cell identifier of the sub node of the IAB node when the IAB node is under the target IAB donor-CU) from the target IAB donor-CU of the IAB node, and the sub node of the IAB node can perform cell measurement and cell handover according to the candidate cell identifier after the IAB node migrates to the target IAB donor-CU.

Figure 5:
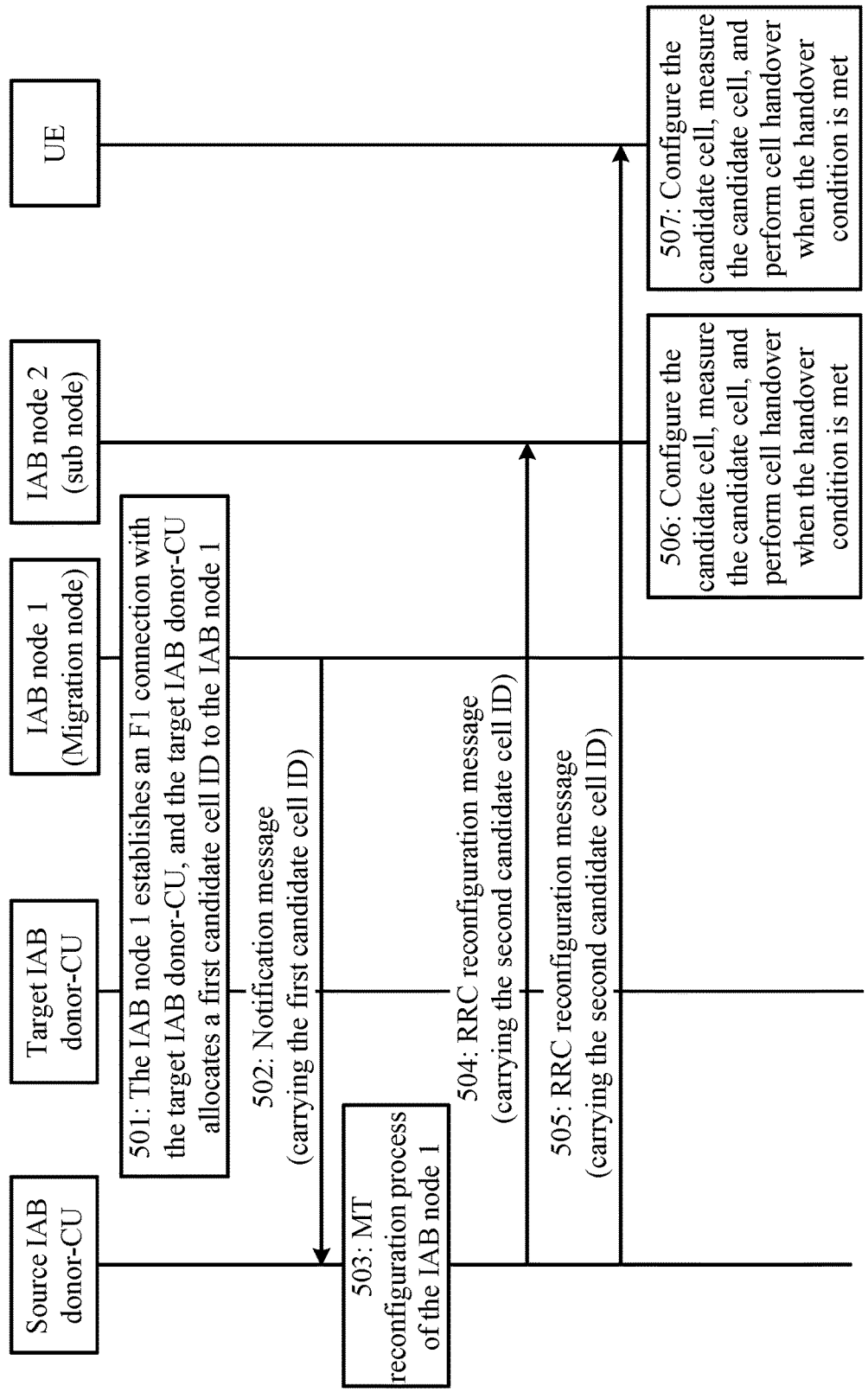
FIG. 5 is a schematic diagram of signaling interaction of the transmission process of the candidate cell configuration information of the migration node according to the embodiments of the present application.

Based on the process shown in FIG. 3, FIG. 5 exemplarily shows a signaling interaction process in a specific scenario. In this process, the JAB node obtains the candidate cell identifier of the IAB node when the IAB node is under the target IAB donor-CU from the target IAB donor-CU, and sends the candidate cell identifier to the source IAB donor-CU, and the source IAB donor-CU sends the candidate cell identifier to the sub node of the IAB node and/or the terminal connected to the sub node of the IAB node.

As shown, the IAB node 1 is a migration node, the JAB node 2 is a sub node of the JAB node 1, and the UE is a terminal connected to the IAB node 1. The process may include the following steps.

Step 501: Performing an F1 connection establishment process between the DU of the IAB node 1 and the target IAB donor-CU. Through this process, the target IAB donor-CU allocates a first candidate cell ID to the IAB node 1, and sends the first candidate cell ID to the IAB node.

Here, the first candidate cell ID may include IDs of one or more candidate cells.

In one embodiment, the F1 connection establishment process may include the following steps.

The IAB node-DU sends an F1 setup request message to the target IAB donor-CU, to request to establish an F1 connection with the target IAB donor-CU.

The target IAB donor-CU allocates the first candidate cell ID for the IAB node, and sends an F1 setup response message carrying the first candidate cell ID to the IAB node.

Step 502: The IAB node sends a notification message to the source IAB donor-CU, where the notification message carries the first candidate cell ID.

Here, the notification message is an F1AP message. In this step, the IAB node sends the first candidate cell ID to the source IAB donor-CU through the F1 connection with the source IAB donor-CU.

In one embodiment, the mapping relationship between the first candidate cell ID of the IAB node 1 and the original cell ID of the IAB node 1 (the original candidate cell ID refers to the cell ID of the IAB node 1 under the source IAB donor-CU) may be determined by the DU of the IAB node 1. In one embodiment, the IAB node 1 may determine the mapping relationship between the new candidate cell ID and the original cell ID according to the configuration of the OAM network element.

In one embodiment, the IAB node 1 may send the above mapping relationship between the candidate cell ID and the original cell ID to the source IAB donor-CU through the above notification message, and the source IAB donor-CU performs handover preparation and handover configuration according to the mapping relationship.

Step 503: The IAB node 1 performs the MT reconfiguration process.

In one embodiment, the MT reconfiguration process of the IAB node 1 may include the following steps.

The source IAB donor-CU sends a handover request (Xn handover request) message to the target IAB donor-CU through the Xn interface with the target IAB donor-CU, to request reconfiguration of the MT of the IAB node 1; the target IAB donor-CU allocates resources for the IAB node 1 after receiving the handover request message, and then sends a handover request acknowledge (Xn handover request ACK) message to the source IAB donor-CU through the Xn interface, where the handover request acknowledge message is encapsulated with an RRC reconfiguration message to be sent to the IAB node 1, and the RRC reconfiguration message carries relevant configuration information; and the source IAB donor-CU sends the RRC reconfiguration message to the IAB node 1, and the IAB node 1 performs the MT reconfiguration.

Step 504: The source IAB donor-CU sends an RRC reconfiguration message to the IAB node 2, where the RRC reconfiguration message carries a second candidate cell ID.

In one embodiment, the source IAB donor-CU sends the RRC reconfiguration message to the IAB node 2 according to the above mapping relationship (the mapping relationship between the third cell identifier and the first candidate cell identifier) and the cell of the IAB node 2 before migration.

In one embodiment, the second candidate cell ID carried in the RRC reconfiguration message may be at least one of the first candidate cell IDs sent by the IAB node 1 to the source IAB donor-CU.

In one embodiment, the RRC reconfiguration message may also carry handover-related configuration information required when the sub node and/or UE of the IAB node accesses the candidate cell. In one embodiment, the handover-related configuration information may include: access configuration information required for handover, optional radio resource configuration information, and the like.

Step 505: The source IAB donor-CU sends an RRC reconfiguration message to the UE, where the RRC reconfiguration message carries the second candidate cell ID.

In one embodiment, the source IAB donor-CU sends the RRC reconfiguration message to the IAB node 2 according to the above mapping relationship (the mapping relationship between the third cell identifier and the first candidate cell identifier) and the cell of the UE before migration.

In one embodiment, the second candidate cell ID carried in the RRC reconfiguration message may be at least one of the first candidate cell IDs sent by the IAB node 1 to the source IAB donor-CU.

In one embodiment, the RRC reconfiguration message may also carry handover-related configuration information required when the sub node and/or UE of the IAB node accesses the candidate cell. In one embodiment, the handover-related configuration information may include: access configuration information required for handover, optional radio resource configuration information, and the like.

Step 506: After receiving the RRC reconfiguration message, the IAB node 2 configures the candidate cell, measures the signal quality of the candidate cell, and performs cell handover when the signal quality of the candidate cell meets the handover condition.

In this step, the IAB node 2 may configure according to the handover-related configuration information and the second candidate cell ID carried in the RRC reconfiguration message, but the corresponding handover-related configuration information does not take effect until it is detected that a candidate cell meets the handover condition, and the IAB node 2 performs cell handover according to the effective handover-related configuration information.

Step 507: After receiving the RRC reconfiguration message, the UE configures the candidate cell, measures the signal quality of the candidate cell, and performs cell handover when the signal quality of the candidate cell meets the handover condition.

In this step, the UE may configure according to the handover-related configuration information and the second candidate cell ID carried in the RRC reconfiguration message, but the corresponding handover-related configuration information does not take effect until it is detected that a candidate cell meets the handover condition, and the UE performs cell handover according to the effective handover-related configuration information.

It should be noted that the time sequence of steps in the process of FIG. 5 is just an example. For example, in some other scenarios, the order of step 504 and step 505 may be exchanged, and step 503 may also occur before step 501, which are not limited in the embodiment of the present application. If step 503 occurs before step 501, the MT of the IAB node 1 needs to support dual connectivity.

Figure 6:
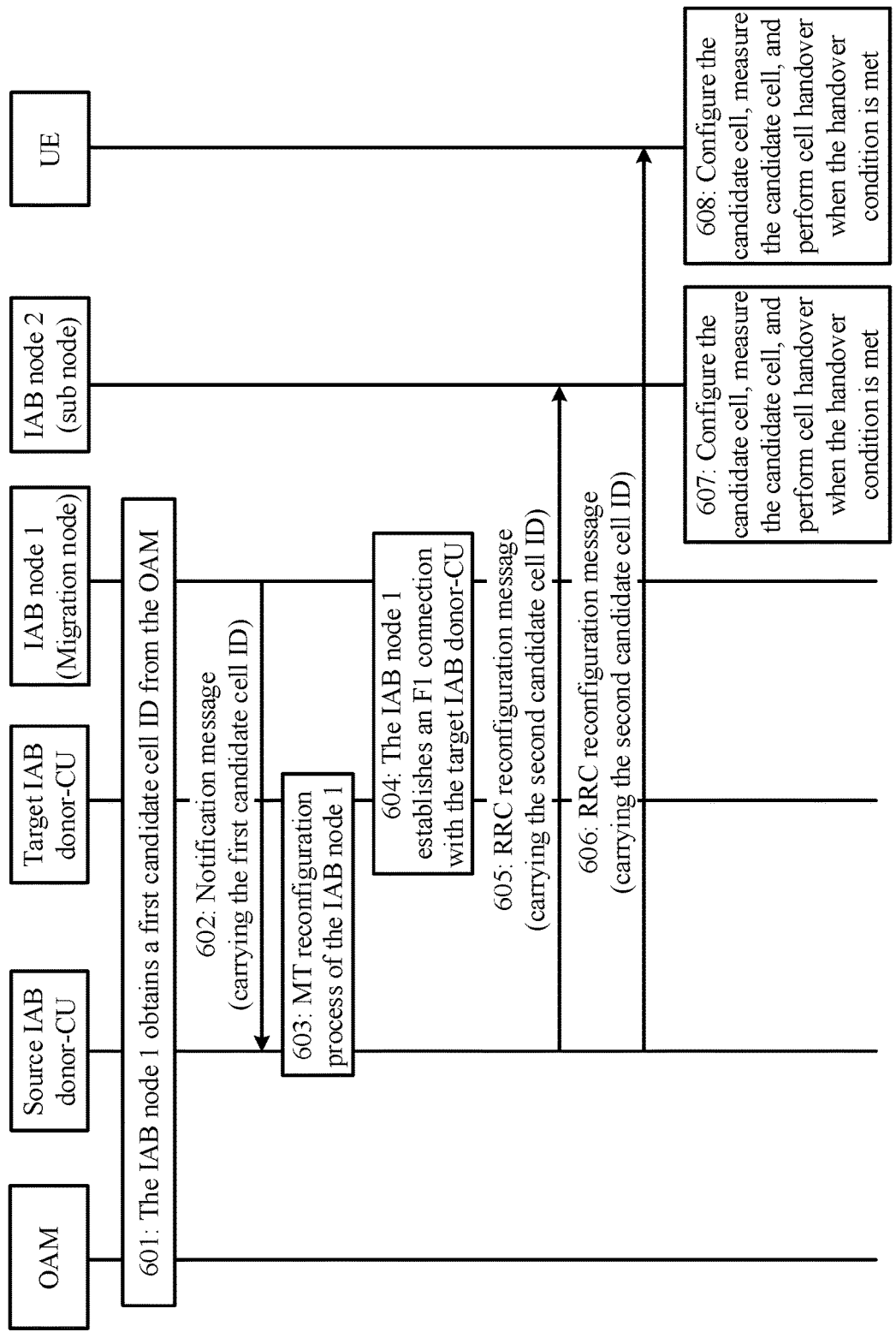
FIG. 6 is a schematic diagram of another signaling interaction of the transmission process of the candidate cell configuration information of the migration node according to the embodiments of the present application.

Based on the process shown in FIG. 3, FIG. 6 exemplarily shows a signaling interaction process in a specific scenario. The difference of this process from the process shown in FIG. 5 is: the IAB node obtains the candidate cell identifier of the IAB node when the IAB node is under the target IAB donor-CU from the OAM network element.

As shown, the IAB node 1 is a migration node, the IAB node 2 is a sub node of the IAB node 1, and the UE is a terminal connected to the IAB node 1. The process may include the following steps.

Step 601: The IAB node 1 obtains a first candidate cell ID from the OAM network element.

In one embodiment, the IAB node 1 may send an obtaining request message to the OAM network element, for requesting to obtain the candidate cell ID of the sub node of the IAB node 1 under the target IAB donor-CU; and the OAM network element sends an obtaining response message to the IAB node 1, where the obtaining response message carries the candidate cell ID of the sub node of the IAB node 1 under the target IAB donor-CU.

Step 602: The IAB node sends a notification message to the source IAB donor-CU, where the notification message carries the first candidate cell ID.

The specific implementation of this step is the same as the relevant content in the process shown in FIG. 5, and will not be repeated here.

Step 603: The IAB node 1 performs the MT reconfiguration process.

The specific implementation of this step is the same as the relevant content in the process shown in FIG. 5, and will not be repeated here.

Step 604: Performing an F1 connection establishment process between the DU of the IAB node 1 and the target IAB donor-CU.

In one embodiment, the F1 connection establishment process may include: the DU of the IAB node sends an F1 setup request message to the target IAB donor-CU to request to establish an F1 connection with the target IAB donor-CU; and the target IAB donor-CU sends an F1 setup response message to the IAB node.

Step 605: The source IAB donor-CU sends an RRC reconfiguration message to the IAB node 2, where the RRC reconfiguration message carries a second candidate cell ID.

Step 606: The source IAB donor-CU sends an RRC reconfiguration message to the UE, where the RRC reconfiguration message carries the second candidate cell ID.

Step 607: After receiving the RRC reconfiguration message, the IAB node 2 configures the candidate cell, measures the signal quality of the candidate cell, and performs cell handover when the signal quality of the candidate cell meets the handover condition.

Step 608: After receiving the RRC reconfiguration message, the UE configures the candidate cell, measures the signal quality of the candidate cell, and performs cell handover when the signal quality of the candidate cell meets the handover condition.

In the process shown in FIG. 6, the specific implementation process of steps 605 to 608 is the same as the relevant steps in the process shown in FIG. 5, and will not be repeated here.

It should be noted that the time sequence of steps in the process of FIG. 6 is just an example. For example, in some other scenarios, the order of step 603 and step 604 may be exchanged, which is not limited in the embodiment of the present application.

Figure 7:
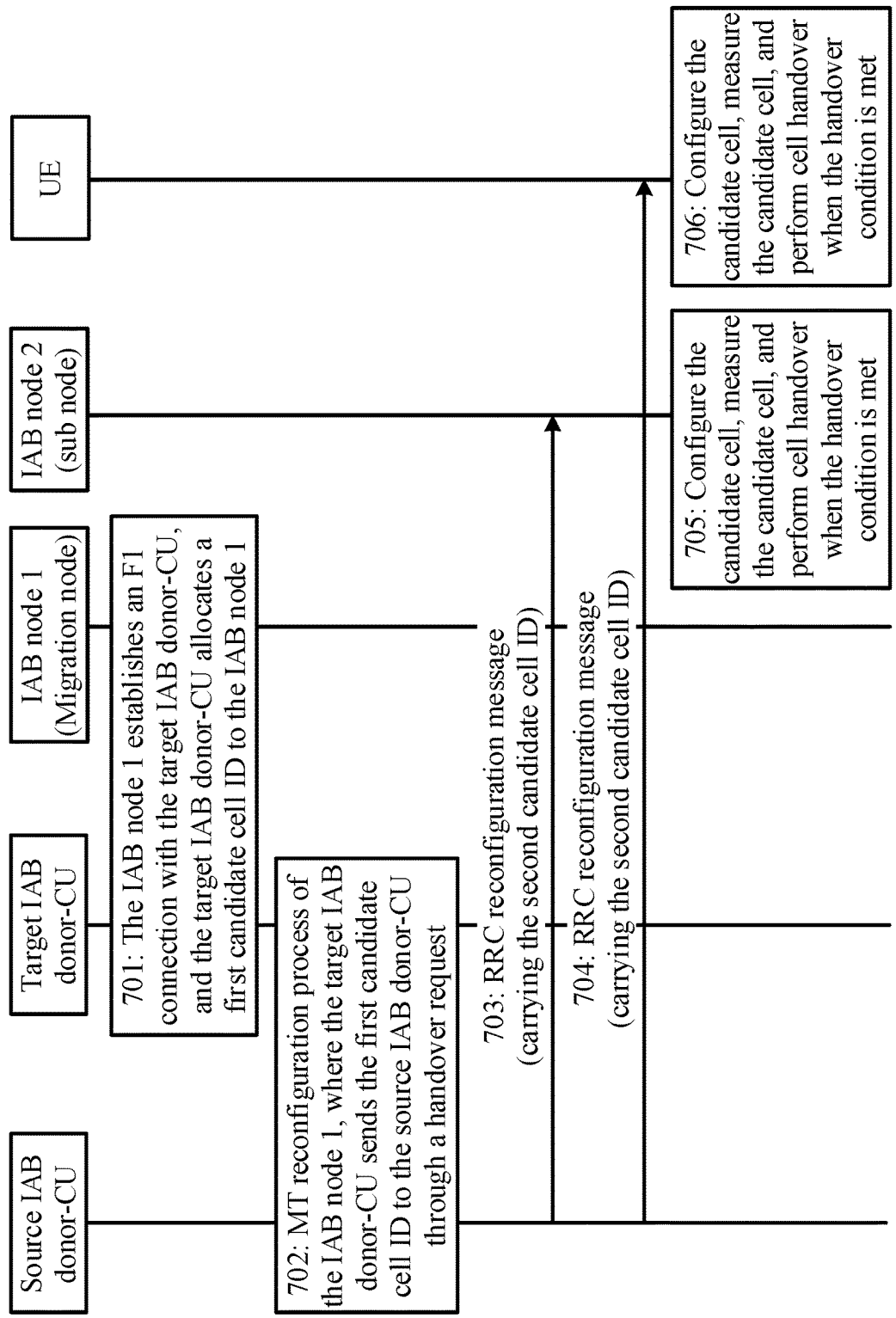
FIG. 7 is a schematic diagram of another signaling interaction of the transmission process of the candidate cell configuration information of the migration node according to the embodiments of the present application.

Based on the process shown in FIG. 4, FIG. 7 exemplarily shows a signaling interaction process in a specific scenario. In this process, the target IAB donor-CU sends the candidate cell identifier of the IAB node to the source IAB donor-CU through an interface with the source IAB donor-CU, and the source IAB donor-CU sends the candidate cell identifier to the sub node of the IAB node and/or the terminal connected to the sub node of the IAB node.

As shown, the IAB node 1 is a migration node, the IAB node 2 is a sub node of the IAB node 1, and the UE is a terminal connected to the IAB node 1. The process may include the following steps.

Step 701: Performing an F1 connection establishment process between the DU of the IAB node 1 and the target IAB donor-CU. Through this process, the target IAB donor-CU allocates a first candidate cell ID to the IAB node 1.

In one embodiment, the F1 connection establishment process may include the following steps: the DU of the IAB node sends an F1 setup request message to the target IAB donor-CU to request to establish an F1 connection with the target IAB donor-CU; and the target IAB donor-CU allocates the first candidate cell ID for the IAB node, and sends an F1 setup response message to the IAB node. In one embodiment, the F1 setup response message may carry the first candidate cell ID.

Step 702: The IAB node 1 performs the MT reconfiguration process. Through this process, the target IAB donor-CU sends the first candidate cell identifier to the source IAB donor-CU through the interface with the source IAB donor-CU.

In one embodiment, the MT reconfiguration process of the IAB node 1 may include the following steps.

The source IAB donor-CU sends a handover request (Xn handover request) message to the target IAB donor-CU through the Xn interface with the target IAB donor-CU.

After receiving the handover request message, the target IAB donor-CU sends a handover request acknowledge (Xn handover request ACK) message to the source IAB donor-CU through the Xn interface. The handover request acknowledge message carries the first candidate cell ID. In one embodiment, the handover request acknowledge message may also carry handover-related configuration information, which is the resource configuration required for the sub node of the IAB node 1 to access the candidate cell; and the handover request acknowledge message is also encapsulated with an RRC reconfiguration message.

The source IAB donor-CU sends the RRC reconfiguration message to the IAB node 1, and the IAB node 1 performs the MT reconfiguration.

In one embodiment, after obtaining the first candidate cell ID, the source IAB donor-CU determines a mapping relationship between the third cell ID (that is, the cell identifier of the IAB node when the IAB node 1 is under the source IAB donor-CU) and the first candidate cell ID.

Step 703: The source IAB donor-CU sends an RRC reconfiguration message to the JAB node 2, where the RRC reconfiguration message carries a second candidate cell ID.

Step 704: The source IAB donor-CU sends an RRC reconfiguration message to the UE, where the RRC reconfiguration message carries the second candidate cell ID.

Step 705: After receiving the RRC reconfiguration message, the IAB node 2 configures the candidate cell, measures the signal quality of the candidate cell, and performs cell handover when the signal quality of the candidate cell meets the handover condition.

Step 706: After receiving the RRC reconfiguration message, the UE configures the candidate cell, measures the signal quality of the candidate cell, and performs cell handover when the signal quality of the candidate cell meets the handover condition.

In the process shown in FIG. 7, the specific implementation process of steps 703 to 706 is the same as the relevant steps in the process shown in FIG. 5, and will not be repeated here.

It should be noted that the time sequence of steps in the process of FIG. 7 is just an example. For example, in some other scenarios, the order of step 704 and step 703 may be exchanged, which is not limited in the embodiment of the present application.

Figure 8:
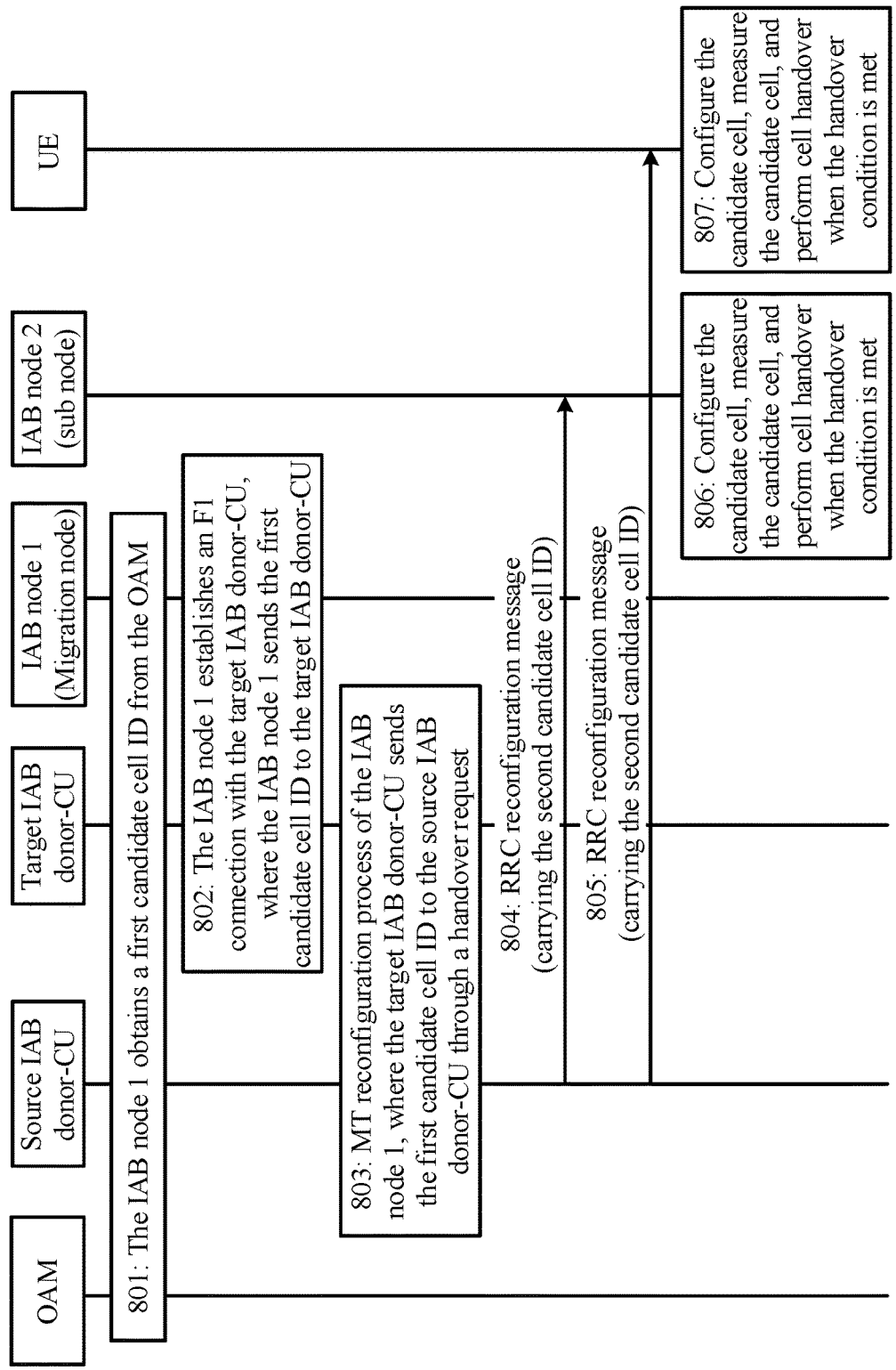
FIG. 8 is a schematic diagram of another signaling interaction of the transmission process of the candidate cell configuration information of the migration node according to the embodiments of the present application.

Based on the process shown in FIG. 4, FIG. 8 exemplarily shows a signaling interaction process in a specific scenario. The difference of this process from the process shown in FIG. 7 is: the IAB node obtains the candidate cell identifier of the IAB node when the JAB node is under the target IAB donor-CU from the OAM network element.

As shown, the IAB node 1 is a migration node, the JAB node 2 is a sub node of the JAB node 1, and the UE is a terminal connected to the IAB node 1. The process may include the following steps.

Step 801: The IAB node 1 obtains a first candidate cell ID from the OAM network element.

The specific implementation process of this step is the same as the relevant content in the process shown in FIG. 6, and will not be repeated here.

Step 802: Performing an F1 connection establishment process between the DU of the IAB node 1 and the target IAB donor-CU. Through this process, the IAB node 1 sends the first candidate cell ID to the target IAB donor-CU.

In one embodiment, the F1 connection establishment process may include the following steps: the DU of the IAB node sends an F1 setup request message to the target IAB donor-CU to request to establish an F1 connection with the target IAB donor-CU, where the request message carries the first candidate cell ID; and the target IAB donor-CU sends an F1 setup response message to the IAB node.

Step 803: The IAB node 1 performs the MT reconfiguration process. Through this process, the target IAB donor-CU sends the first candidate cell identifier to the source IAB donor-CU through the interface with the source IAB donor-CU.

In one embodiment, after obtaining the first candidate cell ID, the source IAB donor-CU determines a mapping relationship between the third cell ID (that is, the cell identifier of the IAB node when the IAB node 1 is under the source IAB donor-CU) and the first candidate cell ID.

The specific implementation of this step is the same as the relevant content in the process shown in FIG. 7, and will not be repeated here.

Step 804: The source IAB donor-CU sends an RRC reconfiguration message to the IAB node 2, where the RRC reconfiguration message carries a second candidate cell ID.

Step 805: The source IAB donor-CU sends an RRC reconfiguration message to the UE, where the RRC reconfiguration message carries the second candidate cell ID.

Step 806: After receiving the RRC reconfiguration message, the IAB node 2 configures the candidate cell, measures the signal quality of the candidate cell, and performs cell handover when the signal quality of the candidate cell meets the handover condition.

Step 807: After receiving the RRC reconfiguration message, the UE configures the candidate cell, measures the signal quality of the candidate cell, and performs cell handover when the signal quality of the candidate cell meets the handover condition.

In the process shown in FIG. 8, the specific implementation process of steps 804 to 807 is the same as the relevant steps in the process shown in FIG. 7, and will not be repeated here.

It should be noted that the time sequence of steps in the process of FIG. 8 is just an example. For example, in some other scenarios, the order of step 804 and step 805 may be exchanged, which is not limited in the embodiment of the present application.

Figure 9:
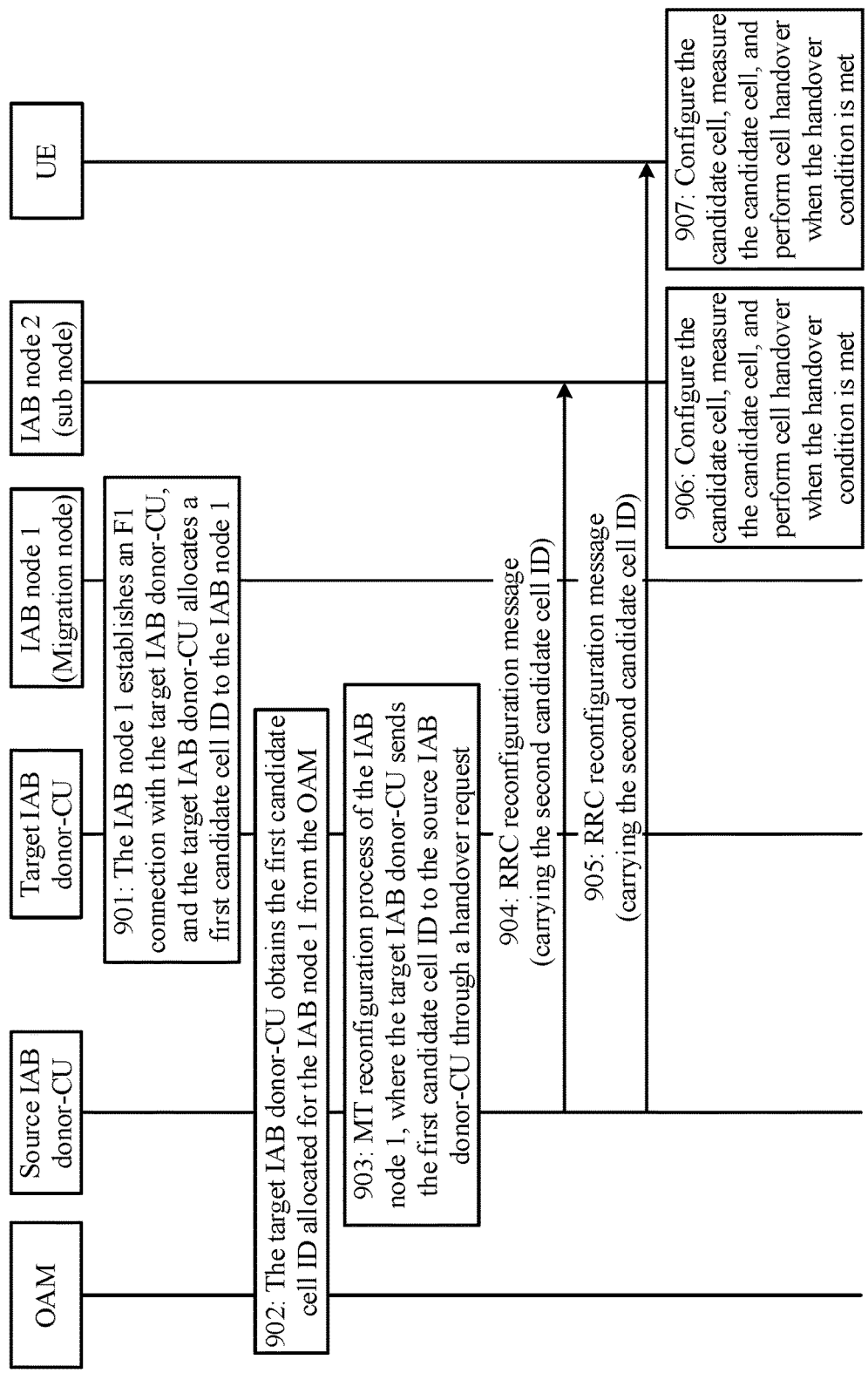
FIG. 9 is a schematic diagram of yet another signaling interaction of the transmission process of the candidate cell configuration information of the migration node according to the embodiments of the present application.

Based on the process shown in FIG. 4, FIG. 9 exemplarily shows a signaling interaction process in a specific scenario. The difference of this process from the process shown in FIG. 7 is: the target IAB donor-CU obtains the candidate cell identifier of the JAB node when the JAB node is under the target IAB donor-CU from the OAM network element.

As shown, the IAB node 1 is a migration node, the JAB node 2 is a sub node of the JAB node 1, and the UE is a terminal connected to the IAB node 1. The process may include the following steps.

Step 901: Performing an F1 connection establishment process between the DU of the IAB node 1 and the target IAB donor-CU.

In one embodiment, the F1 connection establishment process may include the following steps: the DU of the IAB node sends an F1 setup request message to the target IAB donor-CU to request to establish an F1 connection with the target IAB donor-CU; and the target IAB donor-CU sends an F1 setup response message to the IAB node.

Step 902: The target IAB donor-CU obtains a first candidate cell ID from the OAM network element.

Step 903: The IAB node 1 performs the MT reconfiguration process. Through this process, the target IAB donor-CU sends the first candidate cell identifier to the source IAB donor-CU through the interface with the source IAB donor-CU.

Step 904: The source IAB donor-CU sends an RRC reconfiguration message to the IAB node 2, where the RRC reconfiguration message carries a second candidate cell ID.

Step 905: The source IAB donor-CU sends an RRC reconfiguration message to the UE, where the RRC reconfiguration message carries the second candidate cell ID.

Step 906: After receiving the RRC reconfiguration message, the IAB node 2 configures the candidate cell, measures the signal quality of the candidate cell, and performs cell handover when the signal quality of the candidate cell meets the handover condition.

Step 907: After receiving the RRC reconfiguration message, the UE configures the candidate cell, measures the signal quality of the candidate cell, and performs cell handover when the signal quality of the candidate cell meets the handover condition.

In the process shown in FIG. 9, the specific implementation process of steps 903 to 907 is the same as the relevant steps in the process shown in FIG. 7, and will not be repeated here.

It should be noted that the time sequence of steps in the process of FIG. 9 is just an example, and is not limited in the embodiment of the present application.

An embodiment of the present application further provides an IAB donor-CU device, which can implement the functions of the IAB donor-CU in the foregoing embodiments.

Figure 10:
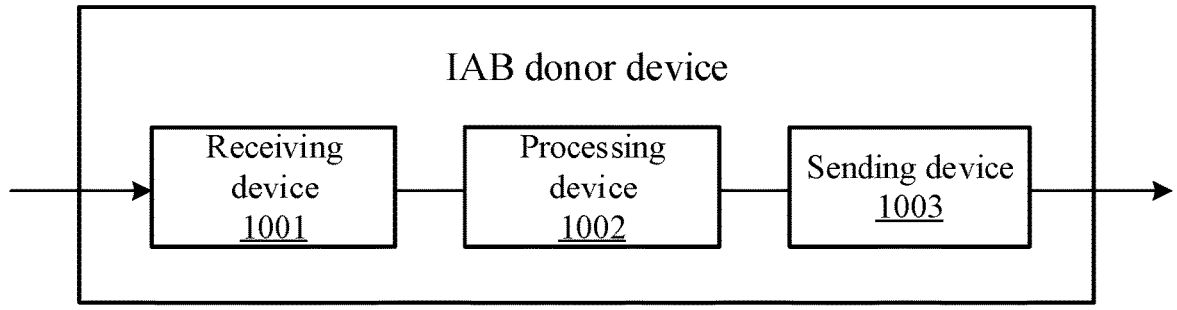
FIG. 10 is a schematic structural diagram of an IAB donor-CU according to an embodiment of the present application.

Referring to FIG. 10, it is a schematic structural diagram of an IAB donor-CU device according to an embodiment of the present application. As shown, the IAB donor-CU may include: a receiving device 1001, a processing device 1002 and a sending device 1003.

When the IAB donor-CU is the source IAB donor-CU:

The receiving device 1001 is configured to receive a first candidate cell identifier from an IAB node or a first candidate cell identifier from a target IAB donor-CU of the IAB node; where the first candidate cell identifier is allocated for the IAB node migrating to the target IAB donor-CU, and the first candidate cell identifier includes a candidate cell identifier of a sub node of the IAB node and/or a terminal connected to the IAB node;

The sending device 1003 is configured to send a second candidate cell identifier to the sub node of the IAB node and/or the terminal connected to the sub node of the IAB node, where the second candidate cell identifier includes at least one of the first candidate cell identifiers.

In one embodiment, the receiving device 1001 is specifically configured to: receive a notification message sent by the IAB node, where the notification message carries the first candidate cell identifier, and the notification message is an F1AP message.

In one embodiment, the notification message further carries a mapping relationship between the first candidate cell identifier and a third cell identifier, where the third cell identifier is a cell identifier of the IAB node when the IAB node is under the source IAB donor-CU.

In one embodiment, the sending device 1003 is further configured to: send a handover request message to the target IAB donor-CU; the receiving device 1001 is further configured to: receive a handover request acknowledge message sent by the target IAB donor-CU, where the handover request acknowledge message is encapsulated with an RRC reconfiguration message; and the sending device 1003 is further configured to: send the RRC reconfiguration message to the IAB node.

In one embodiment, the sending device 1003 is specifically configured to: send a handover request message to the target IAB donor-CU; the receiving device 1001 is specifically configured to: receive a handover request acknowledge message of the target IAB donor-CU, where the handover request acknowledge message is encapsulated with an RRC reconfiguration message and the first candidate cell identifier; and the sending device 1003 is further configured to: send the RRC reconfiguration message to the IAB node.

In one embodiment, the processing device 1002 is configured to: after receiving the handover request acknowledge message of the target IAB donor-CU, determine a mapping relationship between a third cell identifier of the IAB node and the first candidate cell identifier, where the third cell identifier is a cell identifier of the IAB node when the IAB node is under the source IAB donor-CU; and the sending device 1003 is specifically configured to: send at least one of the first candidate cell identifiers to the sub node of the IAB node and/or the terminal connected to the sub node of the IAB node according to the mapping relationship.

In one embodiment, when the first candidate cell identifier is from the IAB node, the first candidate cell identifier is obtained by the IAB node from the target IAB donor-CU; or, when the first candidate cell identifier is from the IAB node, the first candidate cell identifier is obtained by the IAB node from an OAM network element.

In one embodiment, the first candidate cell identifier is obtained according to an F1 setup response message from the target IAB donor-CU when the IAB node establishes an F1 connection with the target IAB donor-CU, and the F1 setup response message carries the first candidate cell identifier allocated by the target IAB donor-CU to the IAB node.

In one embodiment, when the first candidate cell identifier is from the target IAB donor-CU, the first candidate cell identifier is allocated by the target IAB donor-CU to the IAB node according to an F1 setup request message from the IAB node; or, when the first candidate cell identifier is from the target IAB donor-CU, the first candidate cell identifier is obtained by the target IAB donor-CU from an OAM network element.

In one embodiment, the receiving device 1001 is further configured to: receive a mapping relationship between the first candidate cell identifier and a third cell identifier from the IAB node, where the third cell identifier is a cell identifier of the IAB node when the IAB node is under the source IAB donor-CU; or the source IAB donor-CU determines the mapping relationship; and the sending device 1003 is specifically configured to: send at least one of the first candidate cell identifiers to the sub node of the IAB node and/or the terminal connected to the sub node of the IAB node according to the mapping relationship.

In one embodiment, the sending device 1003 is specifically configured to: send an RRC reconfiguration message to the sub node and/or the terminal connected to the sub node of the IAB node, where the RRC reconfiguration message carries the second candidate cell identifier.

In one embodiment, the sending device 1003 is further configured to: send handover-related configuration information to the sub node and/or the terminal connected to the sub node of the IAB node.

When the IAB donor-CU is the target IAB donor-CU:

The receiving device 1001 is configured to obtain a first candidate cell identifier, where the first candidate cell identifier has the same meaning as that in the foregoing embodiments;

The sending device 1003 is configured to send the first candidate cell identifier to a source IAB donor-CU of the IAB node, and the source IAB donor-CU sends a second candidate cell identifier to a sub node of the IAB node and/or a terminal connected to the sub node of the IAB node, where the second candidate cell identifier includes at least one of the first candidate cell identifiers.

In one embodiment, the receiving device 1001 is specifically configured to: receive an F1 setup request message from the IAB node; the processing device 1002 is configured to: allocate the first candidate cell identifier for the IAB node according to the F1 setup request message; and the sending device 1003 is specifically configured to: send an F1 setup response message to the IAB node, where the F1 setup response message carries the first candidate cell identifier.

In one embodiment, the receiving device 1001 is specifically configured to: obtain the first candidate cell identifier from an OAM network element.

In one embodiment, the receiving device 1001 is specifically configured to: receive a handover request message from the source IAB donor-CU; and the sending device 1003 is specifically configured to: send a handover request acknowledge message to the source IAB donor-CU, where the handover request acknowledge message carries the first candidate cell identifier.

It should be noted here that the above-mentioned IAB donor-CU device provided by this embodiment of the disclosure can implement all or some of the method steps implemented by the IAB donor-CU in the above-mentioned method embodiments and can achieve the same effects. The parts and beneficial effects in this embodiment same as those in the method embodiments will not be specifically described here in detail.

An embodiment of the present application further provides an IAB node device, which can implement the functions of the IAB node in the foregoing embodiments.

Figure 11:
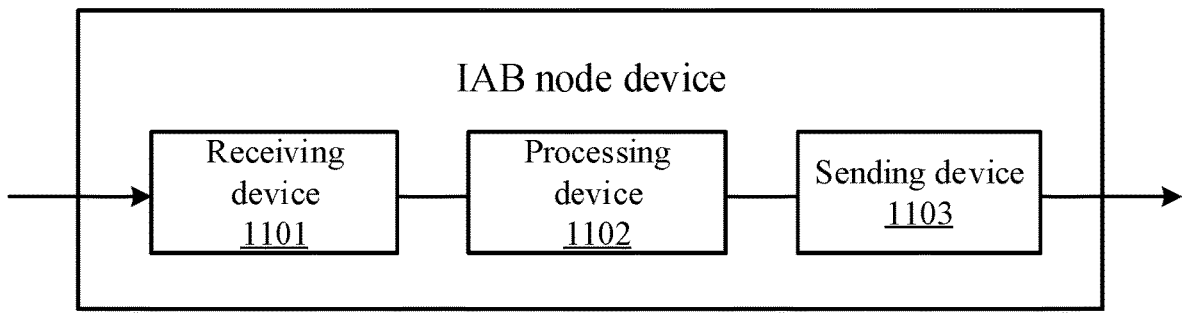
FIG. 11 is a schematic structural diagram of an IAB node device according to an embodiment of the present application.

Referring to FIG. 11, it is a schematic structural diagram of an IAB node device according to an embodiment of the present application. As shown, the IAB node device may include: a receiving device 1101, a processing device 1102 and a sending device 1103.

The receiving device 1101 is configured to obtain a first candidate cell identifier, where the first candidate cell identifier has the same meaning as that in the foregoing embodiments.

The IAB node sends the first candidate cell identifier to a source IAB donor-CU of the IAB node.

In one embodiment, the sending device 1103 is specifically configured to: send an F1 setup request message to a target IAB donor-CU of the IAB node; and the receiving device 1101 is specifically configured to: receive an F1 setup response message sent by the target IAB donor-CU, where the F1 setup response message carries the first candidate cell identifier allocated by the target IAB donor-CU to the IAB node.

In one embodiment, the receiving device 1101 is specifically configured to: obtain the first candidate cell identifier from an OAM network element.

In one embodiment, the sending device 1103 is specifically configured to: send a notification message to the source IAB donor, where the notification message carries the first candidate cell identifier, and the notification message is an F1AP message.

In one embodiment, the notification message further carries a mapping relationship between the first candidate cell identifier and a third cell identifier, where the third cell identifier is a cell identifier of the IAB node when the IAB node is under the source IAB donor-CU.

It should be noted here that the above-mentioned IAB node device provided by this embodiment of the disclosure can implement all the method steps implemented by the IAB node in the above-mentioned method embodiments and can achieve the same effects. The parts and beneficial effects in this embodiment same as those in the method embodiments will not be specifically described here in detail.

An embodiment of the present application further provides a communication device. The communication device may be an IAB donor or an IAB donor-CU.

Figure 12:
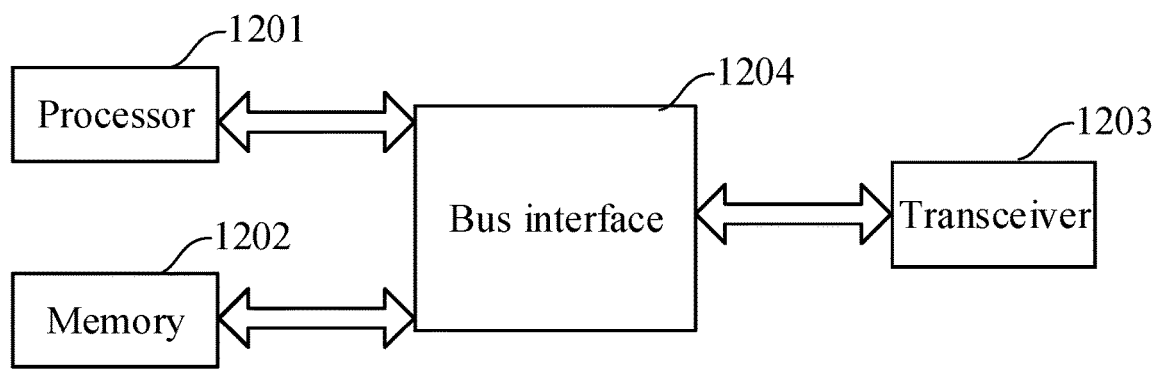
FIG. 12 is a schematic structural diagram of a communication device according to embodiments of the present application.

Referring to FIG. 12, it is a schematic structural diagram of a communication device according to an embodiment of the present application. As shown, the communication device may include: a processor 1201, a memory 1202, a transceiver 1203 and a bus interface 1204.

The processor 1201 is responsible for managing the bus architecture and general processing, and the memory 1202 may store the data used by the processor 1201 when performing operations. The transceiver 1203 is configured to receive and send the data under the control of the processor 1201.

The bus architecture may include any numbers of interconnected buses and bridges, and specifically link various circuits of one or more processors represented by the processor 1201 and the memory represented by the memory 1202. The bus architecture may further link various other circuits such as peripheral device, voltage regulator and power management circuit, which are all well known in the art and thus will not be further described again herein. The bus interface provides an interface. The processor 1201 is responsible for managing the bus architecture and general processing, and the memory 1202 may store the data used by the processor 1201 when performing operations.

The procedure disclosed by the embodiment of the present application may be applied in the processor 1201 or implemented by the processor 1201. In the implementation process, the steps of the signal processing flow may be completed by an integrated logic circuit of hardware or instructions in the form of software in the processor 1201. The processor 1201 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 1202, and the processor 1201 reads the information in the memory 1202 and completes the steps of the signal processing flow in combination with its hardware.

In one embodiment, the processor 1201 is configured to read computer instructions in the memory 1202 and perform the following operations:

receive a first candidate cell identifier from an IAB node or a first candidate cell identifier from a target IAB donor-CU of the IAB node; where the first candidate cell identifier is allocated for the IAB node migrating to the target IAB donor-CU, and the first candidate cell identifier includes a candidate cell identifier of a sub node of the IAB node and/or a terminal connected to the IAB node;

send a second candidate cell identifier to the sub node of the IAB node and/or the terminal connected to the IAB node, where the second candidate cell identifier includes at least one of the first candidate cell identifiers.

In one embodiment, when receiving the first candidate cell identifier from the IAB node, the processor 1201 is specifically configured to:

receive a notification message sent by the IAB node, where the notification message carries the first candidate cell identifier, and the notification message is an F1AP message.

In one embodiment, the notification message further carries a mapping relationship between the first candidate cell identifier and a third cell identifier, where the third cell identifier is a cell identifier of the IAB node when the IAB node is under the source IAB donor-CU.

In one embodiment, the processor 1201 is further configured to:

send a handover request message to the target IAB donor-CU;

receive a handover request acknowledge message sent by the target IAB donor-CU, where the handover request acknowledge message is encapsulated with an RRC reconfiguration message;

send the RRC reconfiguration message to the IAB node.

In one embodiment, when receiving the first candidate cell identifier from the target IAB donor-CU of the IAB node, the processor 1201 is specifically configured to:

send a handover request message to the target IAB donor-CU;

receive a handover request acknowledge message of the target IAB donor-CU, where the handover request acknowledge message is encapsulated with an RRC reconfiguration message and the first candidate cell identifier;

send the RRC reconfiguration message to the IAB node.

In one embodiment, after receiving the handover request acknowledge message of the target IAB donor-CU, the processor 1201 is further configured to:

determine a mapping relationship between a third cell identifier of the IAB node and the first candidate cell identifier, where the third cell identifier is a cell identifier of the IAB node when the IAB node is under the source IAB donor-CU;

when sending the second candidate cell identifier to the sub node of the IAB node and/or the terminal connected to the IAB node, the processor 1201 is specifically configured to:

send at least one of the first candidate cell identifiers to the sub node of the IAB node and/or the terminal connected to the IAB node according to the mapping relationship.

In one embodiment, when the first candidate cell identifier is from the IAB node, the first candidate cell identifier is obtained by the IAB node from the target IAB donor-CU; or
  when the first candidate cell identifier is from the IAB node, the first candidate cell identifier is obtained by the IAB node from an OAM network element.

In one embodiment, the first candidate cell identifier is obtained according to an F1 setup response message from the target IAB donor-CU when the IAB node establishes an F1 connection with the target IAB donor-CU, and the F1 setup response message carries the first candidate cell identifier allocated by the target IAB donor-CU to the IAB node.

In one embodiment, when the first candidate cell identifier is from the target IAB donor-CU, the first candidate cell identifier is allocated by the target IAB donor-CU to the IAB node according to an F1 setup request message from the IAB node; or
  when the first candidate cell identifier is from the target IAB donor-CU, the first candidate cell identifier is obtained by the target IAB donor-CU from an OAM network element.

In one embodiment, the processor 1201 is further configured to:
  receive a mapping relationship between the first candidate cell identifier and a third cell identifier from the IAB node, where the third cell identifier is a cell identifier of the IAB node when the IAB node is under the source IAB donor-CU; or determine the mapping relationship;
  when sending the second candidate cell identifier to the sub node of the IAB node and/or the terminal connected to the IAB node, the processor 1201 is specifically configured to:
  send at least one of the first candidate cell identifiers to the sub node of the IAB node and/or the terminal connected to the IAB node according to the mapping relationship.

In one embodiment, the processor 1201 is specifically configured to:
  send an RRC reconfiguration message to the sub node and/or the terminal connected to the IAB node, where the RRC reconfiguration message carries the second candidate cell identifier.

In one embodiment, the processor 1201 is further configured to:
  send handover-related configuration information to the sub node and/or the terminal connected to the IAB node.

An embodiment of the present application further provides a communication device. The communication device may be an IAB donor or an IAB donor-CU.

Figure 13:
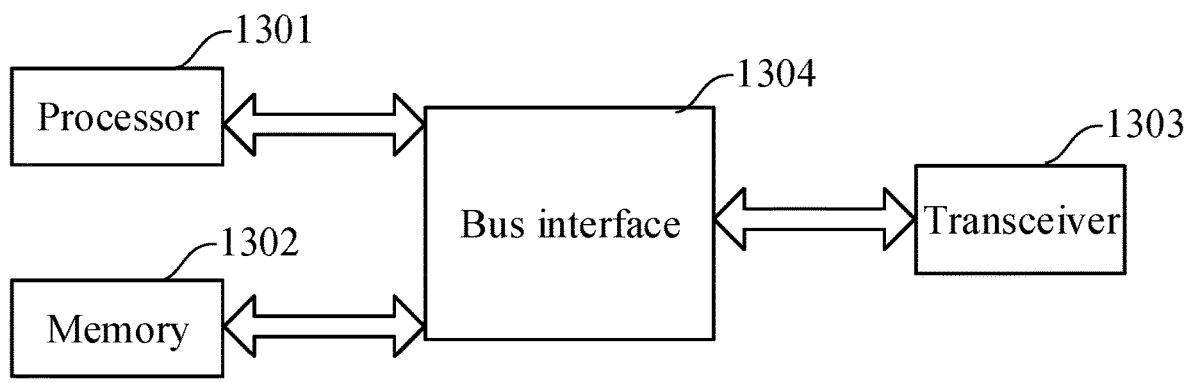
FIG. 13 is a schematic structural diagram of another communication device according to embodiments of the present application.

Referring to FIG. 13, it is a schematic structural diagram of a communication device according to an embodiment of the present application. As shown, the communication device may include: a processor 1301, a memory 1302, a transceiver 1303 and a bus interface 1304.

The processor 1301 is responsible for managing the bus architecture and general processing, and the memory 1302 may store the data used by the processor 1301 when performing the operations. The transceiver 1303 is configured to receive and send the data under the control of the processor 1301.

The bus architecture may include any numbers of interconnected buses and bridges, and specifically link various circuits of one or more processors represented by the processor 1301 and the memory represented by the memory 1302. The bus architecture may further link various other circuits such as peripheral device, voltage regulator and power management circuit, which are all well known in the art and thus will not be further described again herein. The bus interface provides an interface. The processor 1301 is responsible for managing the bus architecture and general processing, and the memory 1302 may store the data used by the processor 1301 when performing operations.

The procedure disclosed by the embodiment of the present application may be applied in the processor 1301 or implemented by the processor 1301. In the implementation process, the steps of the signal processing flow may be completed by an integrated logic circuit of hardware or instructions in the form of software in the processor 1301. The processor 1301 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 1302, and the processor 1301 reads the information in the memory 1302 and completes the steps of the signal processing flow in combination with its hardware.

In one embodiment, the processor 1301 is configured to read computer instructions in the memory 1302 and perform the following operations:
  obtain a first candidate cell identifier, where the first candidate cell identifier is allocated for an IAB node migrating to a target IAB donor-CU, and the first candidate cell identifier includes a candidate cell identifier of a sub node of the IAB node and/or a terminal connected to the IAB node;
  send the first candidate cell identifier to a source IAB donor-CU of the IAB node.

In one embodiment, the processor 1301 is specifically configured to:
  receive an F1 setup request message from the IAB node;
  allocate the first candidate cell identifier to the IAB node according to the F1 setup request message, and send an F1 setup response message to the IAB node, where the F1 setup response message carries the first candidate cell identifier.

In one embodiment, the processor 1301 is specifically configured to:
  obtain the first candidate cell identifier from an OAM network element.

In one embodiment, the processor 1301 is specifically configured to:
  receive a handover request message from the source IAB donor-CU;
  send a handover request acknowledge message to the source IAB donor-CU, where the handover request acknowledge message carries the first candidate cell identifier.

It should be noted here that the two communication devices provided by the embodiments of the disclosure can implement all the method steps implemented by the IAB donor-CU in the above-mentioned method embodiments and can achieve the same effects. The parts and beneficial effects in the embodiments same as those in the method embodiments will not be specifically described here in detail.

An embodiment of the present application further provides a communication device. The communication device may be an IAB node.

Figure 14:
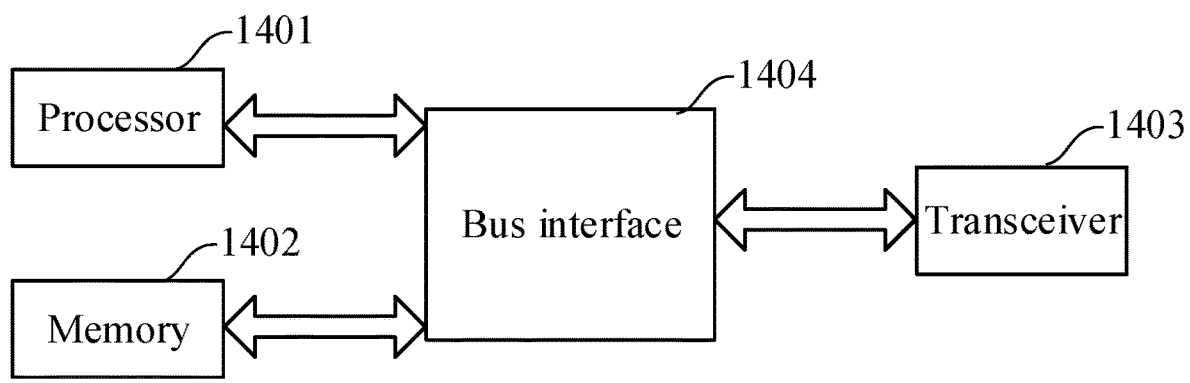
FIG. 14 is a schematic structural diagram of a yet another communication device according to embodiments of the present application.

Referring to FIG. 14, it is a schematic structural diagram of a communication device according to an embodiment of the present application. As shown, the communication device may include: a processor 1401, a memory 1402, a transceiver 1403 and a bus interface 1404.

The processor 1401 is responsible for managing the bus architecture and general processing, and the memory 1402 may store the data used by the processor 1401 when performing the operations. The transceiver 1403 is configured to receive and send the data under the control of the processor 1401.

The bus architecture may include any numbers of interconnected buses and bridges, and specifically link various circuits of one or more processors represented by the processor 1401 and the memory represented by the memory 1402. The bus architecture may further link various other circuits such as peripheral device, voltage regulator and power management circuit, which are all well known in the art and thus will not be further described again herein. The bus interface provides an interface. The processor 1401 is responsible for managing the bus architecture and general processing, and the memory 1402 may store the data used by the processor 1401 when performing the operations.

The procedure disclosed by the embodiment of the present application may be applied in the processor 1401 or implemented by the processor 1401. In the implementation process, each step of the signal processing flow may be completed by an integrated logic circuit of hardware or instructions in the form of software in the processor 1401. The processor 1401 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 1402, and the processor 1401 reads the information in the memory 1402 and completes the steps of the signal processing flow in combination with its hardware.

In one embodiment, the processor 1401 is configured to read computer instructions in the memory 1402 and perform the following operations:

obtain a first candidate cell identifier, where the first candidate cell identifier is allocated for an IAB node migrating to a target IAB donor-CU, and the first candidate cell identifier includes a candidate cell identifier of a sub node of the IAB node and/or a terminal connected to the IAB node;

send the first candidate cell identifier to a source IAB donor-CU of the IAB node.

In one embodiment, the processor 1401 is specifically configured to:

send an F1 setup request message to the target IAB donor-CU of the IAB node;

receive an F1 setup response message sent by the target IAB donor-CU, where the F1 setup response message carries the first candidate cell identifier allocated by the target IAB donor-CU to the IAB node.

In one embodiment, the processor 1401 is specifically configured to:

obtain the first candidate cell identifier from an OAM network element.

In one embodiment, the processor 1401 is specifically configured to:

send a notification message to the source IAB donor, where the notification message carries the first candidate cell identifier, and the notification message is an F1AP message.

In one embodiment, the notification message further carries a mapping relationship between the first candidate cell identifier and a third cell identifier, where the third cell identifier is a cell identifier of the IAB node when the IAB node is under the source IAB donor-CU.

It should be noted here that the above-mentioned communication device provided by this embodiment of the disclosure can implement all the method steps implemented by the IAB node in the above-mentioned method embodiments and can achieve the same effects. The parts and beneficial effects in this embodiment same as those in the method embodiments will not be specifically described here in detail.

An embodiment of the present application further provides a computer readable storage medium storing computer executable instructions which are configured to cause a computer to execute the method performed by the IAB donor-CU in the above-mentioned embodiments.

An embodiment of the present application further provides a computer readable storage medium storing computer executable instructions which are configured to cause a computer to execute the method performed by the IAB node in the above-mentioned embodiments.

The embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, and an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, and the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, and a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. An information transmission method, comprising:
   receiving, by a source Integrated Access and Backhaul, IAB, donor-Centralized Unit, CU, of an IAB node, a first candidate cell identifier from the IAB node or a first candidate cell identifier from a target IAB donor-CU of the IAB node; wherein the first candidate cell identifier is allocated for the IAB node migrating to the target IAB donor-CU, and the first candidate cell identifier comprises a candidate cell identifier of a sub node of the IAB node and/or a candidate cell identifier of a terminal connected to the IAB node;
   sending, by the source IAB donor-CU, a Radio Resource Control, RRC comprising a second candidate cell identifier to the sub node of the IAB node and/or the terminal connected to the IAB node, wherein the second candidate cell identifier comprises at least one of the first candidate cell identifiers;
   measuring, by the sub node of the IAB node and/or the terminal connected to the sub node of the IAB node, a candidate cell according to the second candidate cell identifier, and switching to the candidate cell in response to a handover condition being met according to a measurement result of the candidate cell, or configuring a candidate cell, measuring a signal quality of the candidate cell, and switching to the candidate cell in response to the signal quality of the candidate cell meeting a handover condition.

2. The method according to claim 1, wherein the receiving, by the source IAB donor-CU of the IAB node, the first candidate cell identifier from the IAB node, comprises:
   receiving, by the source IAB donor, a notification message sent by the IAB node, wherein the notification message carries the first candidate cell identifier, and the notification message is an F1 Application Protocol, F1AP, message;
   wherein the receiving, by the source IAB donor-CU of the IAB node, the first candidate cell identifier from the target IAB donor-CU of the IAB node, comprises:
   sending, by the source IAB donor-CU, a handover request message to the target IAB donor-CU;
   receiving, by the source IAB donor-CU, a handover request acknowledge message of the target IAB donor-CU, wherein the handover request acknowledge message is encapsulated with an RRC reconfiguration message and the first candidate cell identifier;
   sending, by the source IAB donor-CU, the RRC reconfiguration message to the IAB node.

3. The method according to claim 2, wherein in response to the first candidate cell identifier being received from the IAB node the notification message further carries a mapping relationship between the first candidate cell identifier and a third cell identifier, wherein the third cell identifier is a cell identifier of the IAB node in response to the IAB node being under the source IAB donor-CU.

4. The method according to claim 2, further comprising:
   in response to the first candidate cell identifier being received from the IAB node, sending, by the source IAB donor-CU, a handover request message to the target IAB donor-CU;
   receiving, by the source IAB donor-CU, a handover request acknowledge message sent by the target IAB donor-CU, wherein the handover request acknowledge message is encapsulated with a RRC, reconfiguration message;
   sending, by the source IAB donor-CU, the RRC reconfiguration message to the IAB node.

5. The method according to claim 2, wherein in response to the first candidate cell identifier being received from the target IAB donor-CU of the IAB node, after the source IAB donor-CU receives the handover request acknowledge message of the target IAB donor-CU, the method further comprises:
   determining, by the source IAB donor-CU, a mapping relationship between a third cell identifier of the IAB node and the first candidate cell identifier, wherein the third cell identifier is a cell identifier of the IAB node in response to the IAB node being under the source IAB donor-CU;
   the sending, by the source IAB donor-CU, the second candidate cell identifier to the sub node of the IAB node and/or the terminal connected to the IAB node, comprises:
   sending, by the source IAB donor-CU, at least one of the first candidate cell identifiers to the sub node of the IAB node and/or the terminal connected to the IAB node according to the mapping relationship.

6. The method according to claim 1, wherein in response to the first candidate cell identifier being from the IAB node, the first candidate cell identifier is obtained by the IAB node from the target IAB donor-CU; or
   in response to the first candidate cell identifier being from the IAB node, the first candidate cell identifier is obtained by the IAB node from an Operations Administration and Maintenance, OAM, network element;
   wherein in response to the first candidate cell identifier being from the target IAB donor-CU, the first candidate cell identifier is allocated by the target IAB donor-CU to the IAB node according to an F1 setup request message from the IAB node; or
   in response to the first candidate cell identifier being from the target IAB donor-CU, the first candidate cell identifier is obtained by the target IAB donor-CU from an OAM network element.

7. The method according to claim 6, wherein in response to the first candidate cell identifier being from the IAB node, the first candidate cell identifier is obtained according to an F1 setup response message from the target IAB donor-CU in response to the IAB node establishing an F1 connection with the target IAB donor-CU, and the F1 setup response message carries the first candidate cell identifier allocated by the target IAB donor-CU to the IAB node.

8. The method according to claim 1, further comprising:
receiving, by the source IAB donor-CU, a mapping relationship between the first candidate cell identifier and a third cell identifier from the IAB node, wherein the third cell identifier is a cell identifier of the IAB node in response to the IAB node being under the source IAB donor-CU; or determining, by the source IAB donor-CU, the mapping relationship;

the sending, by the source IAB donor-CU, the second candidate cell identifier to the sub node of the IAB node and/or the terminal connected to the IAB node, comprises:

sending, by the source IAB donor-CU, at least one of the first candidate cell identifiers to the sub node of the IAB node and/or the terminal connected to the IAB node according to the mapping relationship.

9. The method according to claim 1, further comprising:
sending, by the source IAB donor-CU, handover-related configuration information to the sub node and/or the terminal connected to the IAB node.

10. A communication device, comprising: a processor and a memory;
the memory stores computer instructions;
the processor is configured to read the computer instructions to perform the method of claim 1.

* * * * *